(12) United States Patent
Nungester et al.

(10) Patent No.: US 9,756,299 B2
(45) Date of Patent: Sep. 5, 2017

(54) HANDHELD DIGITAL DRAWING AND PROJECTION DEVICE

(71) Applicant: CRAYOLA LLC, Easton, PA (US)

(72) Inventors: Gregory R. Nungester, Milford, NJ (US); Carl J. Kamph, Bethlehem, PA (US)

(73) Assignee: CRAYOLA, LLC, Easton, PA (US)

( * ) Notice: Subject to any disclaimer, the term of this patent is extended or adjusted under 35 U.S.C. 154(b) by 116 days.

(21) Appl. No.: 14/685,216

(22) Filed: Apr. 13, 2015

(65) Prior Publication Data

US 2015/0294491 A1 Oct. 15, 2015

Related U.S. Application Data

(60) Provisional application No. 61/979,193, filed on Apr. 14, 2014.

(51) Int. Cl.
| | |
|---|---|
| *G09G 5/00* | (2006.01) |
| *H04N 9/31* | (2006.01) |
| *G06F 3/0354* | (2013.01) |
| *G06F 3/041* | (2006.01) |
| *A63F 13/20* | (2014.01) |

(52) U.S. Cl.
CPC ......... *H04N 9/3141* (2013.01); *G06F 3/0354* (2013.01); *G06F 3/0416* (2013.01); *H04N 9/3179* (2013.01); *H04N 9/3194* (2013.01); *A63F 13/20* (2014.09)

(58) Field of Classification Search
CPC .... G06F 3/0346; G06F 3/0354; G06F 3/0416; H04N 9/31; H04N 9/3141; H04W 88/02; G06T 11/80
USPC .................................................. 345/156, 169
See application file for complete search history.

(56) References Cited

U.S. PATENT DOCUMENTS

| | | | |
|---|---|---|---|
| 7,883,221 B2 | 2/2011 | Nozaki et al. | |
| 8,462,262 B2 | 6/2013 | Yang et al. | |
| 8,554,275 B2 | 10/2013 | Chung | |
| 2007/0265717 A1* | 11/2007 | Chang ................... | G06F 1/1626 700/83 |
| 2009/0113091 A1* | 4/2009 | Miller ................... | G06F 3/0488 710/64 |
| 2010/0085316 A1 | 4/2010 | Kim | |
| 2011/0115823 A1 | 5/2011 | Huebner | |
| 2012/0165077 A1* | 6/2012 | Ueno ................... | G06F 1/1696 455/566 |
| 2012/0268420 A1 | 10/2012 | Marhefka et al. | |
| 2013/0107144 A1 | 5/2013 | Marhefka et al. | |

\* cited by examiner

*Primary Examiner* — Jennifer Nguyen
(74) *Attorney, Agent, or Firm* — Shook, Hardy & Bacon L.L.P.

(57) ABSTRACT

A handheld digital drawing and projection device is provided. The device includes a screen for receiving a user input. In embodiments, a stylus tethered to the device provides the user input at the screen. The device further includes a determining component for determining an output corresponding to the received user input. A projector for projecting the determined output onto an external projection surface is also included. In some embodiments, the projector further projects a display environment, which includes one or more projected elements.

17 Claims, 14 Drawing Sheets

HANDHELD DIGITAL DRAWING AND PROJECTION DEVICE

CROSS-REFERENCE TO RELATED APPLICATIONS

This application claims priority to U.S. provisional patent application No. 61/979,193, filed Apr. 14, 2014, entitled "Handheld Digital Drawing and Projection Device," the entire contents of which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief and at a high level, this disclosure describes, among other things, a handheld digital drawing and projection device. In embodiments, the device receives a user input and projects a corresponding output on an external projection surface. The corresponding output may be projected in the context of various display environments.

DESCRIPTION OF THE DRAWINGS

Illustrative embodiments of the invention are described in detail below with reference to the attached drawing figures, and wherein.

DETAILED DESCRIPTION

Figure 1:
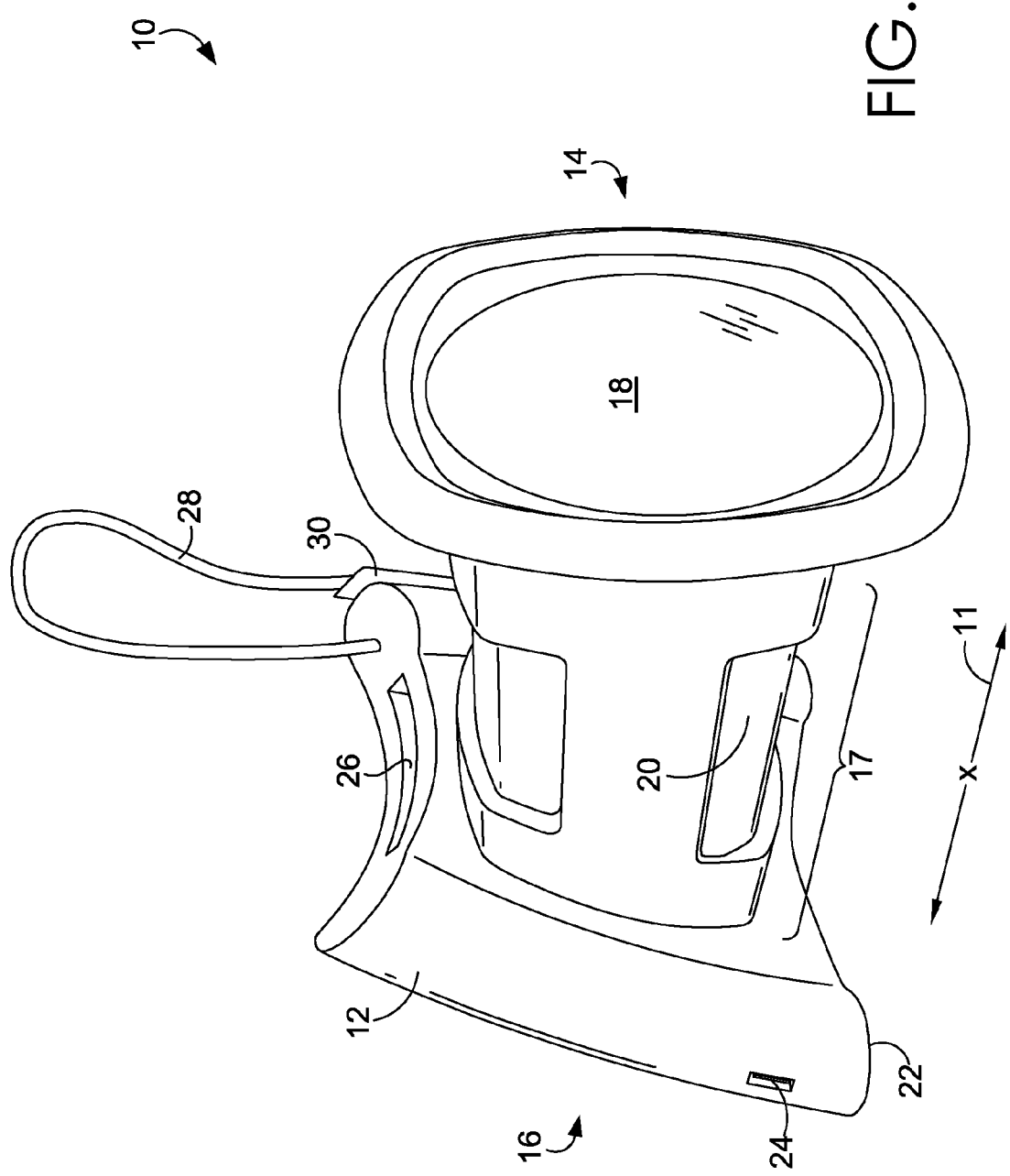
FIG. 1 is a front, perspective view of a handheld digital drawing and projection device, in accordance with an embodiment of the invention.

The subject matter of select embodiments of the invention is described with specificity herein to meet statutory requirements. But the description itself is not intended to necessarily limit the scope of the claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention include a handheld digital drawing and projection device. In embodiments, the device receives a user input and projects a corresponding output on an external projection surface. The corresponding output may be projected in the context of various display environments.

Accordingly, in one embodiment, a handheld digital drawing and projection device is provided. The device includes a screen for receiving a user input. In embodiments, a stylus may be used to provide the user input at the screen, such as a stylus tethered to the digital drawing and projection device. The device further includes a determining component for determining an output corresponding to the received user input. A projector for projecting the determined output onto an external projection surface is also included with the device. In some embodiments, the projector further projects a display environment, which includes one or more projected elements.

The device may further include, in some embodiments, a sensing component for sensing at least one of an acceleration of the device, an orientation of the device, and a magnetic field around the device. In other embodiments, a selecting component for selecting an image to be projected is included. In such embodiments, the selected image is based on the at least one of the sensed acceleration, orientation, and magnetic field. In some embodiments, a particular image is selected based on a particular orientation of the device corresponding to a particular portion of an external projection surface, such that when the sensing component senses the particular orientation of the device, the selecting component selects the particular image to be projected and the projector projects the particular image on the particular portion of the external projection surface. In further embodiments, the selected image includes the determined output corresponding to the received user input, as well as at least a portion of a display environment comprising one or more projected elements.

In other embodiments, the determined output is altered to provide an altered output based on the at least one of the sensed acceleration, orientation, and magnetic field. In one embodiment, the altered output is a mirror reflection of the determined output based on the sensed acceleration of the device.

In another embodiment, a method for projecting an interactive display onto an external projection surface is provided. The method includes receiving a user input on a screen of a handheld digital drawing and projection device. Embodiments of the device include a screen for receiving a user input, a determining component for determining an output corresponding to the received input, and a projector for projecting the determined output onto the external projection surface. The method further includes, at the determining component, determining the output corresponding to the received user input for projection onto the external projection surface, and, at the projector, projecting the determined output onto the external projection surface. In embodiments, the handheld digital drawing and projection device further comprises a speaker, and the method further includes, at the speaker, providing an audio output corresponding to the determined output.

In yet another embodiment, a handheld digital drawing and projection device is provided. The device has a rear end, which includes a rear handle portion and a screen for receiving a user input. In embodiments, the screen is a touch screen that receives the user input based on contact between the touch screen and a stylus. The device also has a front end, which includes a lens through which an output corresponding to the received user input may be projected. An intermediate portion is positioned between the rear end and the front end. In embodiments, at least a portion of the intermediate portion is characterized as having a width that is smaller in size than a width of one or both of the front end and the rear end. The intermediate portion may further include, in embodiments, an intermediate handle portion. Embodiments of the device include a cartridge slot configured to receive a cartridge. A stylus for providing the user input at the screen may be attached to the body of the device by a tether. A stylus holding compartment configured to hold the stylus may also be included. Embodiments of the device further include a data port for recharging a rechargeable battery of the device. In embodiments, the data port is further configured to send and receive data. The device may also include a speaker, as well as at least one sensor for detecting a movement, acceleration, and/or orientation of the device. In embodiments, the at least one sensor includes an accelerometer and a magnetometer, and in further embodiments, the accelerometer and magnetometer enable the device to selectively project a particular image on a particular portion of an external projection surface.

With reference now to the figures, a handheld digital drawing and projection device ("device") is described in accordance with embodiments of the invention. Various embodiments are described with respect to the figures in which like elements are depicted with like reference numerals.

Referring initially to FIG. 1, a front, perspective view of a device 10 is depicted in accordance with an embodiment of the invention. In embodiments, the device 10 has a body 12 orientated along a central longitudinal axis x, indicated by reference numeral 11. In embodiments, the body 12 includes a front end 14, a rear end 16, and an intermediate portion 17 positioned between the front end 14 and the rear end 16. In embodiments, the front end 14 and the rear end 16 are axially opposed along the central longitudinal axis x. Further embodiments of the device 10 include an intermediate handle portion 20 located on the intermediate portion 17, and such handle portion 20 can be used to maneuver the device 10. A user may also, in embodiments, maneuver the device 10 by using a rear handle portion 22 located on the rear end 16. In embodiments, one or more portions of the device 10 may be used to maneuver the device 10, in order to provide a portable, handheld device 10 for manipulation by a user during receipt of user input(s) and projection of corresponding selected images. In some embodiments, at least a portion of the intermediate portion 17 and/or the intermediate handle portion 20 is characterized as having a width that is smaller in size than the width of one or both of the front end 14 and the rear end 16, such that a user can grip and/or support the device 10 with relative ease. In embodiments, the intermediate handle portion 20 may include other characteristics that make it suitable for gripping or supporting by a user, such as a texture applied to at least a portion of the intermediate portion 17.

The device 10 may, in some embodiments, include a data port 24 for sending and/or receiving data. In some embodiments, the data port 24 may be configured for use with a Universal Serial Bus (USB) cable. In further embodiments, the data port 24 may be used to communicatively connect the device 10 to an external computer for the purpose of downloading or uploading data, including image data generated at least in part by the user of the device 10. For example, the data port 24 might enable a user to send and/or share the user's creations made with the device 10. The data port 24 may, alternatively or additionally, be used to provide power to the device 10, such as by charging a rechargeable battery included in the device 10 by connecting the device 10 to a computer or another power source.

Other embodiments of device 10 may include a cartridge slot 26 configured to receive a cartridge, such as the cartridge 52 of FIG. 4 received by cartridge slot 26, discussed in greater detail below in the context of FIGS. 5 and 6.

In embodiments of the invention, the front end 14 includes a lens 18 through which light is transmitted for the purpose of projecting an image from the device 10 onto an external projection surface. In embodiments, light may be provided by an LED light, or any other type of light source.

In further embodiments, the lens 18 may be made of glass, plastic, or any other substance through which light may be at least partially transmitted. Such a substance may be tinted and/or colored.

Figure 2:
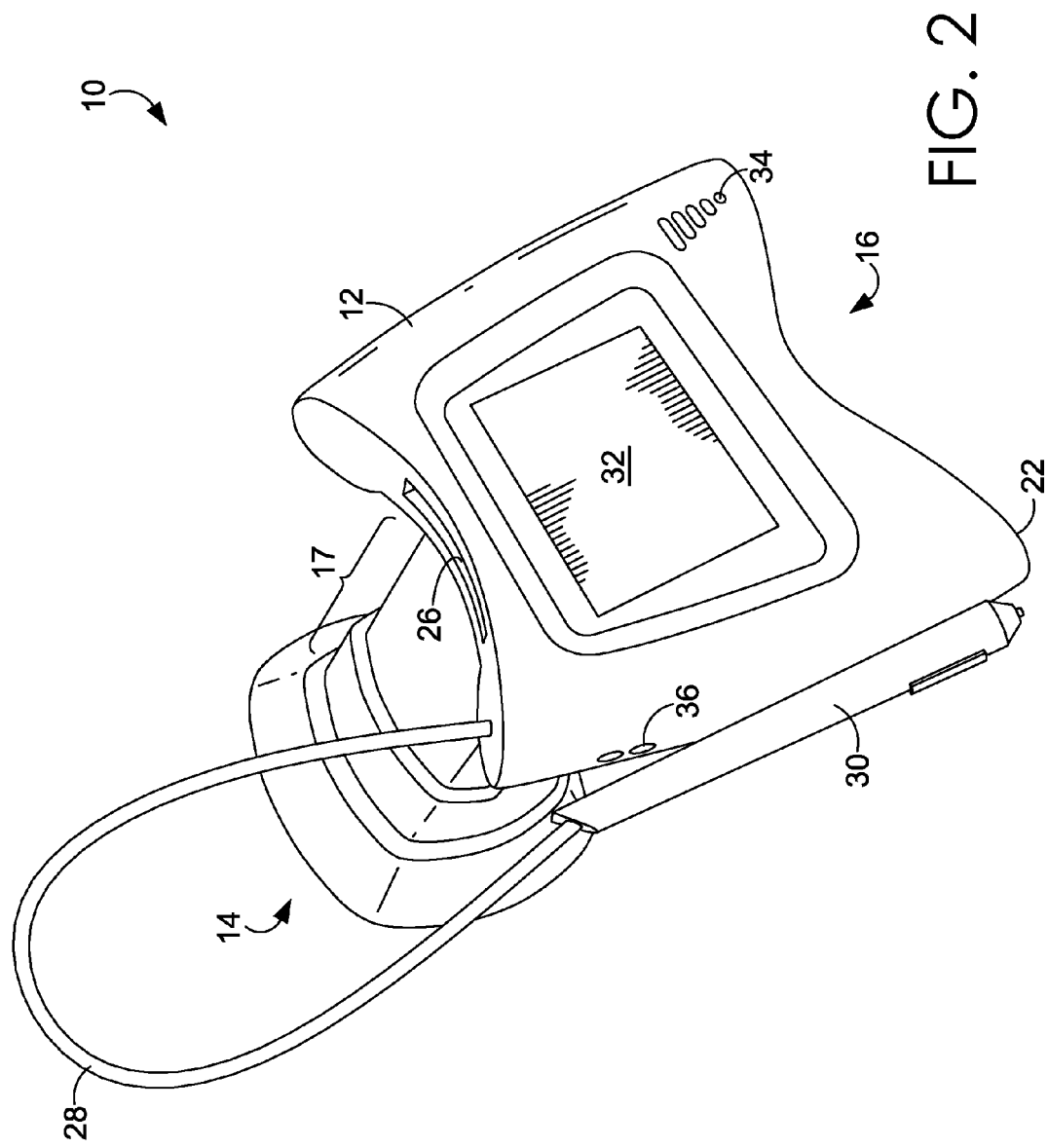
FIG. 2 is a rear, perspective view of a handheld digital drawing and projection device, in accordance with an embodiment of the invention.
Figure 3:
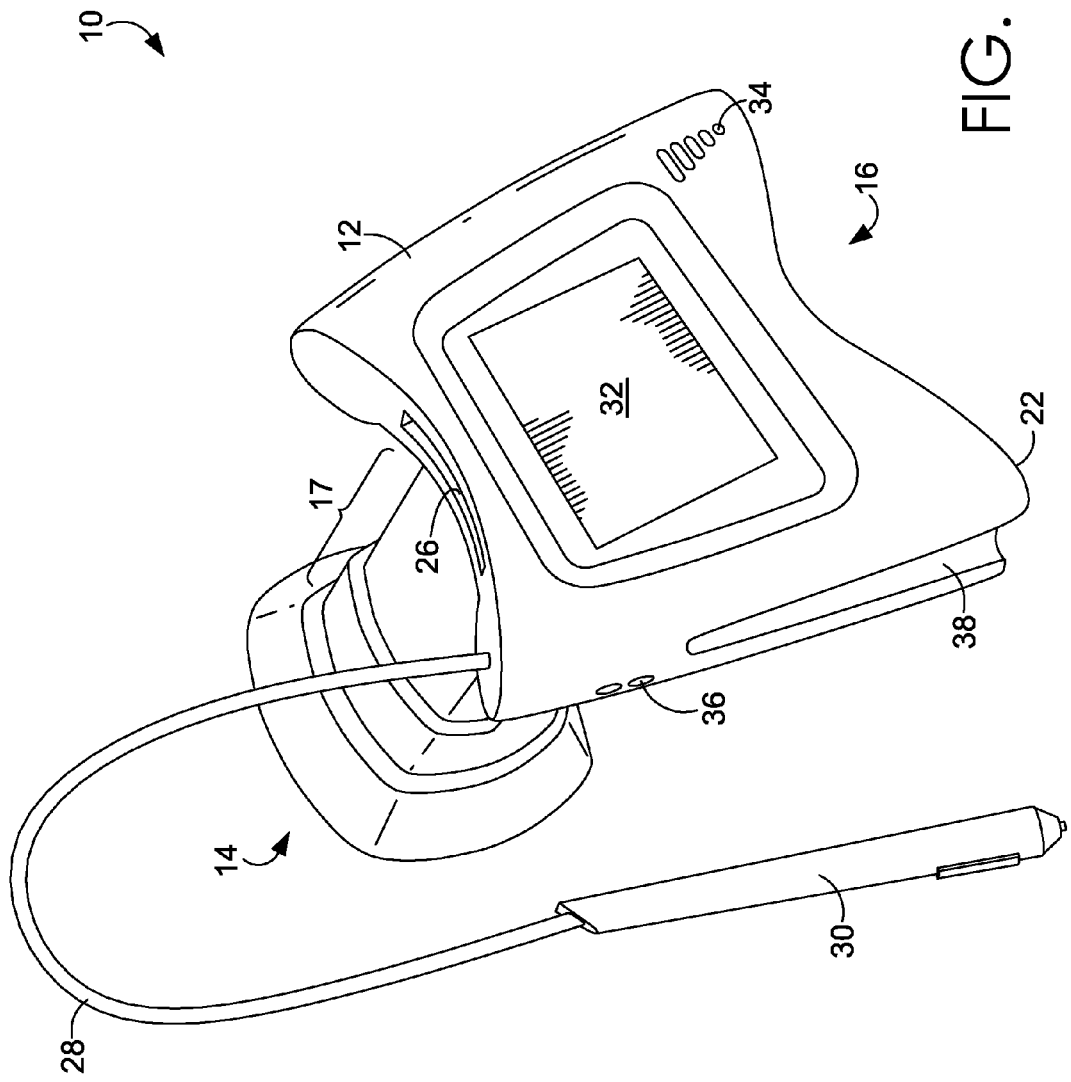
FIG. 3 is a rear, perspective view of a handheld digital drawing and projection device with a tethered stylus removed from a holding compartment, in accordance with an embodiment of the invention.

Turning now to FIGS. 2 and 3, a rear, perspective view of the device 10 is shown. The rear end 16, in embodiments, includes a screen 32 for receiving a user input. In some embodiments, the screen 32 may be a digital screen, a touch screen, a capacitive screen, a resistive screen, a touchpad screen, or any other type of screen that is configured to receive a user input. A user may provide input at the screen 32 by touching or drawing on the screen 32, such as by touching the screen with a stylus device or other tool configured to interact with a touchscreen surface. The screen 32 may be at least partially lit, such as by backlighting, or it may not be lit at all. In embodiments, the screen 32 is 320 by 240 pixels. The screen 32 may be used for receiving user input, providing visual output, or both. In one embodiment, the screen 32 might provide visual output by displaying text or images on the screen 32, such as displaying text or images in response to user input. For example, as a user provides a drawing input on the screen 32, an output corresponding to the user input may be displayed on the screen 32, in addition to an output corresponding to the input being projected on an external projection surface. In some instances, the screen 32 may display the same image, including a display environment (as will be explained in more detail below), that is projected on an external projection surface. Additionally or alternatively, the screen 32 might not provide such visual output. For example, when the user provides a drawing input on the screen 32, an output corresponding to the input may be projected on an external projection surface, but the screen 32 may provide no such output. For example, the screen 32 may remain dark and unchanged while the device 10 is in use. As such, in further embodiments, a user input on the screen 32 is not visible on the screen 32 but is visible as part of a corresponding output on an external projection surface.

In some embodiments, the stylus 30 is used to provide the user input at the screen 32. A user may touch the stylus 30 to the screen 32 in order to provide the desired input. In one embodiment, the screen 32 may be a touch screen and may function via a change in resistance and/or charge when the stylus 30 comes into contact with the screen 32. The stylus 30 might, in embodiments, sense the amount of pressure a user applies when pressing the stylus 30 to the screen 32. Such pressure may correspond to one of several functionalities. For example, a relatively light applied pressure might move a cursor on the screen 32, while a relatively heavy applied pressure might engage a drawing function. The length of contact between the stylus 30 and the screen 32 may also correspond to various functionalities. For example, a quick tap of the stylus 30 on the screen 32 might cause a menu to be presented to a user. A quick tap, or some other type of contact, might also enable a user to choose particular tools and/or features, such as a paint brush, including special effects paint brushes, for drawing. In some embodiments, the user might be presented with numerous drawing options corresponding to various artistic utensils, media, and methods. For example, a user might be provided with a drawing option that mimics the effect of a marker, crayon, or colored pencil, having one of a number of colors and thicknesses. Other drawing options might include paint brushes having various colors, thicknesses, and painting styles, such as water color styles or other special effects styles. Further drawing options might include spray paint or paint splatter. The drawing options provided to a user may mimic any artistic utensil, medium, or method.

In some embodiments, the stylus 30 is a three-state stylus. In such embodiments, the stylus 30 may have a depressible tip. For example, if a user lightly contacts the touch screen with the stylus 30, such that the depressible tip is not depressed, this contact may correspond to a hovering function that allows a user to move a cursor on the touch screen as explained above. Then, for example, if the user contacts the touch screen with the stylus 30 and applies pressure sufficient to depress the depressible tip of the stylus 30, this contact may correspond to a selection function and/or a drawing function. A selection function may be engaged if the cursor is hovering over a selectable feature, such as a menu option, when the user applies pressure sufficient to depress the depressible tip of the stylus 30. A drawing function may be engaged if, upon applying pressure to the tip, such as pressure sufficient to depress the depressible tip of the stylus 30, the stylus 30 produces a drawing effect as it is moved around while in contact with the touch screen. The stylus 30 may further include a third functionality corresponding to a touch button on the side of the stylus 30. This touch button may be used to, among other things, engage the selection function and/or drawing function discussed above. For example, in addition to or instead of applying pressure to depress a depressible tip of the stylus 30, a user may engage the touch button in order to select a menu option or provide a drawing input.

In additional embodiments, the stylus 30 may be tethered to the body 12 of the device 10 by the tether 28 in order to minimize the risk of a user losing the stylus 30. FIG. 3 shows an embodiment of the present invention, where the stylus 30 is removed from a stylus holding compartment 38. The stylus 30 may be stored in the stylus holding compartment 38 when the stylus 30 is not in use, as is shown in FIG. 2 (in FIG. 2, the view of the stylus holding compartment 38 is obstructed by the stylus 30).

In addition to, or instead of, the stylus 30, embodiments of the device 10 may include buttons for navigating menu options and providing user input. Other embodiments may receive user input via user touch, such as a user touching a finger to the screen 32. Embodiments may include other means for providing user input.

Device 10 may, in certain embodiments, include a speaker 34. Speaker 34 may be configured to provide an audio output. The audio output might be specifically selected by a user, or it might be automatically provided based on a user input. For example, in embodiments, a user may provide a particular drawing input at the screen 32, and in response to the type of drawing input, the device 10 may automatically provide a corresponding audio output at speaker 34. For example, if a user provides a drawing input using a spray paint drawing option, the audio output at speaker 34 might be a spraying sound. Similarly, if a user provides a drawing input using a paint splatter drawing option, the audio output at speaker 34 might be a "splat." In other embodiments, the audio output is related to a context corresponding to the drawing input. For example, if a user draws a fish, the audio output might include aquatic noises, such as splashing waves.

Embodiments of device 10 may further include reset buttons 36, for restarting and/or resetting the device 10. For example, if a processor, such as the processor 66 that will be discussed with respect to FIG. 14, associated with the device 10 freezes, or otherwise fails to function properly, the reset buttons 36 may be used to restart and/or reset the device 10.

It will be understood that the device 10 may include additional components not illustrated in FIGS. 2-3, such as a camera. It will further be understood that embodiments of the device 10 may include fewer components than those illustrated in the figures, or additional components not illustrated in the figures.

Figure 4:
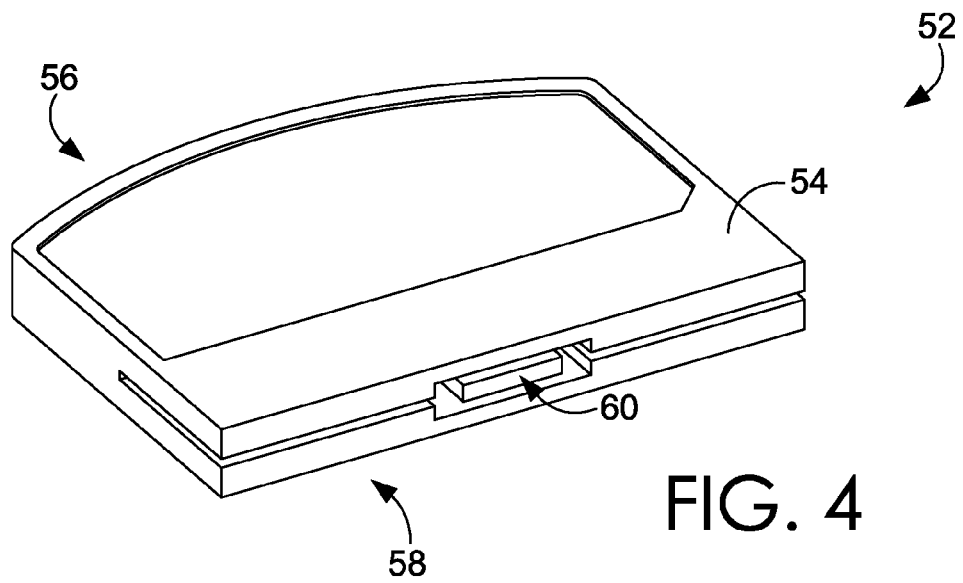
FIG. 4 is a bottom perspective view of a cartridge for use with a handheld digital drawing and projection device, in accordance with an embodiment of the invention.
Figure 5:
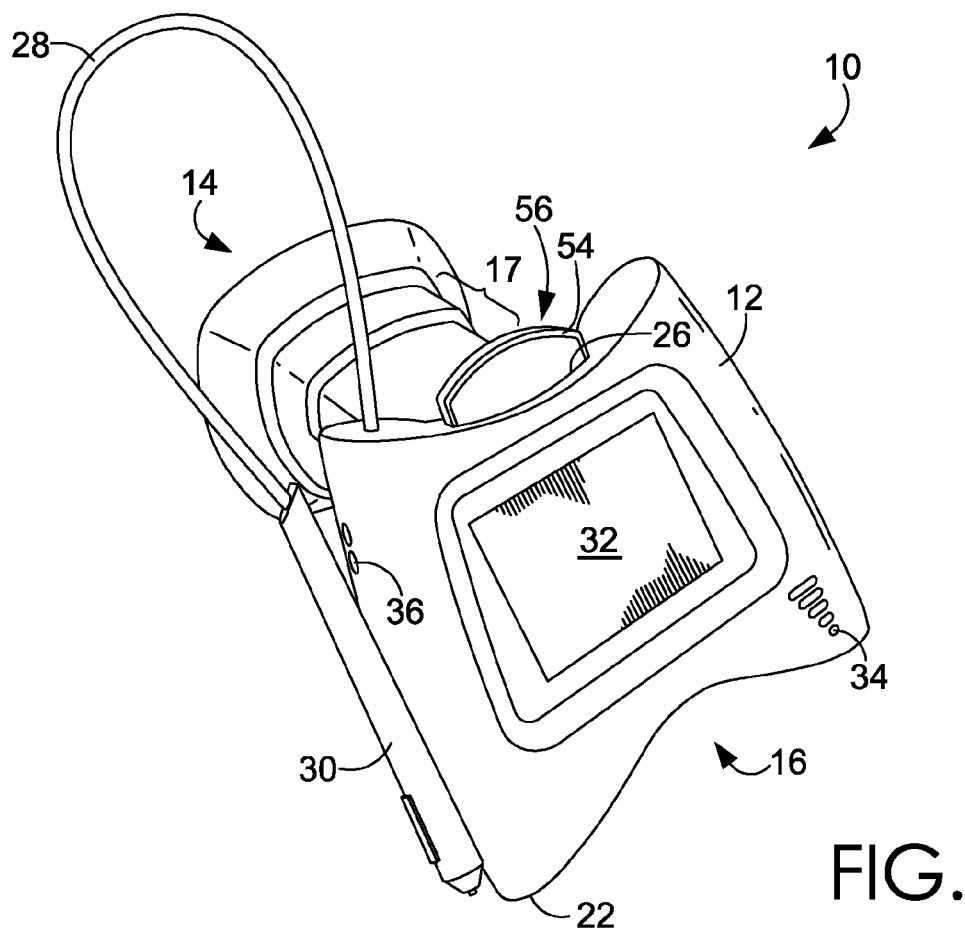
FIG. 5 is a rear, perspective view of a handheld digital drawing and projection device with the cartridge of FIG. 4 inserted in a cartridge slot of the device, in accordance with an embodiment of the invention.

Turning now to FIG. 4, a cartridge 52 having a housing 54, a top portion 56, and a bottom portion 58, is depicted in accordance with an embodiment of the present invention. The cartridge 52 further has a data connection component 60, which provides for the transfer of data from the cartridge 52 to the device 10. In embodiments, the bottom portion 58 of the cartridge 52 is configured to fit into the cartridge slot 26 of the device 10. FIG. 5 illustrates the device 10 having the cartridge 52 inserted in the cartridge slot 26, in accordance with an embodiment of the present invention.

The cartridge 52 may be used, in embodiments, to provide a user with additional content to be used at the device 10, including interactive background images, such as the display environments discussed below, as well as clip art, such as the projected elements discussed below. The cartridge 52 may also include drawing options corresponding to new artistic utensils, media, and methods. Additionally or alternatively, in some embodiments, such additional content may be provided at the data port 24 through, for example, a USB cord attached to a computer.

Figure 6:
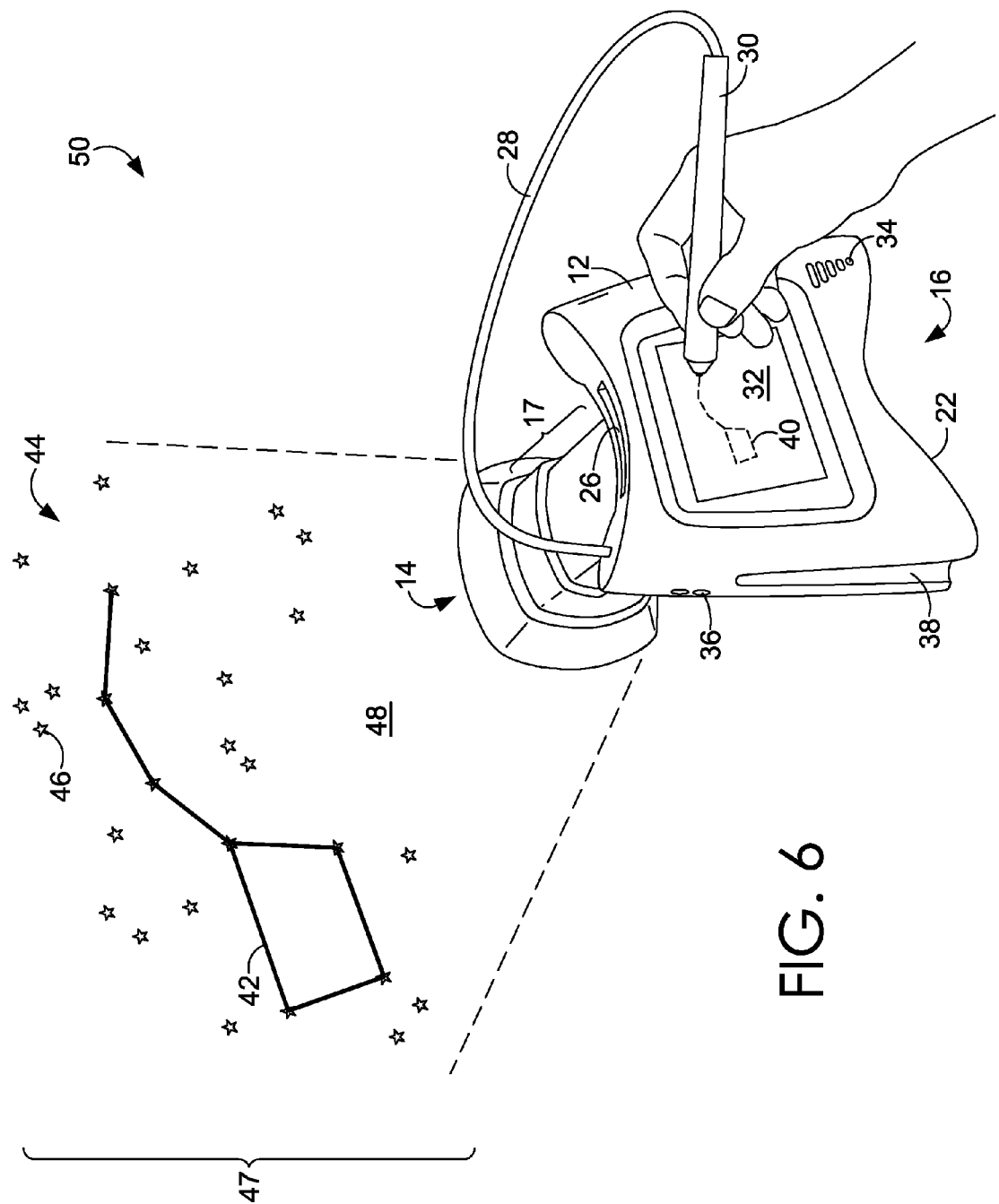
FIG. 6 is a perspective view of an interactive environment, including a handheld digital drawing and projection device receiving a user input on a screen and projecting a corresponding drawn projection, in the context of a display environment, on an external projection surface, in accordance with an embodiment of the invention.

Turning now to FIG. 6, an exemplary interactive environment 50 includes the device 10 and a projected image 47, which may be projected on an external projection surface 48. In embodiments, the projected image 47 includes a drawn projection 42, which corresponds to a user input 40 received at the screen 32. The drawn projection 42 may be projected in the context of a display environment 44, which may include one or more projected elements 46. In embodiments, the one or more projected elements 46 do not depend on the user input 40 but instead provide context for the drawn projection 42 in the display environment 44. Thus, the projected image 47 may include the combination of the drawn projection 42 and the display environment 44, which may include one or more projected elements 46.

In embodiments, the device 10 provides a projection having a 2:1 projection size ratio. In other words, if the device 10 is located 6 feet away from the external projection surface 48, the projected image 47 may measure 3 feet along a vertical, horizontal, or diagonal line across the projected image 47. Similarly, in embodiments, if the device 10 is located 12 feet away from the external projection surface 48, the projected image 47 may measure 6 feet in height, width, or along a diagonal line from one corner to a nonadjacent corner of the projected image 47.

Embodiments of the device 10 include a determining component that, upon receiving the user input 40 at the screen 32, determines an output corresponding to the received input. In FIG. 6, the corresponding output is the drawn projection 42, which is an image resembling an enlarged version of the user input 40. In other embodiments, however, the determined output might bear a more complex relationship to a user input 40. For example, the determined output might be a mirror image of the drawing corresponding to the user input 40. Or the determined output might be a replica of the drawing corresponding to the user input 40, but the output might be rotated a certain number of degrees, such that the output corresponding to the user input 40 is actually, for example, an upside down version of the drawing corresponding to the user input 40. In other embodiments, the determined output might be multiple replicas of the drawing corresponding to the user input 40. For example, if the user input 40 is a drawing resembling a spider, the determined output might be numerous spiders that correspond to the user's drawing of the spider. Such a determined output might also be manipulated such that each individual spider is positioned at a unique angle, some spiders are mirror images of the drawing corresponding to the user input 40, components of the spiders are rearranged or scrambled as compared to the drawing corresponding to the user input 40, or a number of other variations on the user input 40. This type of manipulation at the determining component, as well as other types of manipulation at the determining component, can be used to produce special effects, such as those described above, as well as others described in more below.

As mentioned above, the projected image 47 may include, in some embodiments, a display environment 44, which may itself include one or more projected elements 46. The display environment 44 provides an interactive background that may inspire, or provide context for, a user input 40 and the corresponding output. As depicted in FIG. 6, for example, the display environment 44 corresponds to a night sky and, as such, includes multiple projected elements 46 corresponding to stars. A user is then able to draw within the context of the display environment 44. As in FIG. 6, the drawn projection 42 corresponding to the user input 40, when taken in the context of the display environment 44, gives the impression that the user is drawing the big dipper in the night sky.

A wide variety of display environments can be provided by the device 10. Such display environments might correspond to scenes from the indoors, outdoors, ocean, jungle, desert, outer space, underground, mountains, or any other scene that can be imagined. The display environments might also correspond to a historical era, such as prehistoric or medieval times, or to a futuristic setting. Again, any number of display environments can be provided by the device 10. These display environments might be selected by the user, or they might be provided at random by the device 10. A user may also wish to select an individual projected element, separate from an entire display environment. For example, in embodiments, a user is able select a single star to be added to the projected image. In other embodiments, the user may select a star to add to the display environment corresponding to the night sky. In accordance with such embodiments, a gallery of projected elements, similar to a gallery of clip art, may be provided at the device 10. The user can select specific projected elements, or projected elements may be provided by the device 10 at random.

The external projection surface 48 may be any surface external to the device 10. In embodiments, the external projection surface 48 is a surface of a fixed structure, such as a wall, ceiling, floor, door, or any other similar surface. In other embodiments, the external projection surface 48 includes surfaces of moveable objects, such as furniture, home accessories, stuffed animals, toys, the body and clothing of a person, the body of an animal, and any other surface of any other object external to the device 10. Furthermore, in some embodiments, the external projection surface 48 might actually include multiple, different surfaces. For example, if the front end 14 of device 10 is pointed at a person's legs, a portion of the projected image might fall on the person's legs, while another portion of the projected image might fall on the floor.

In embodiments, the device 10 includes one or more components for sensing the movement, velocity, angular velocity, linear acceleration, rotational acceleration, orientation, and spatial positioning of the device 10. For example, the device 10 may include components for detecting and/or measuring movement corresponding to roll, pitch, and yaw. The device 10 may further include one or more components for measuring a magnetic field, including the earth's magnetic field and/or a magnetic field around the device 10. The aforementioned components may include, in embodiments, an accelerometer, gyroscope, magnetometer, compass, and other instruments that provide measurements relating to the properties described above. The device 10 may further include a microelectromechanical systems (MEMS) device, such as, for example, San Disk (SD) Micro E-Compass. Such components enable a number of features, including special effects features and animation features, as described below.

As the device 10 is handheld and easily moveable and maneuverable, a user can point the device 10 in any direction desired, and at any surface desired. In embodiments, device 10 is configured to project a particular image based on an orientation of the device 10. In this way, the device 10 provides a 360-degree projection environment. For example, in embodiments, when the front end 14 of the device 10 is pointed up, such that the front end 14 faces the ceiling and the axis x is directed toward the ceiling (e.g., the axis x is orthogonal to the plane corresponding to the ceiling surface), the projected image might include a sky scene. Then, when the device 10 is rotated such that the front end 14 faces the floor and the axis x is directed toward the floor (e.g., the axis x is orthogonal to the plane corresponding to the floor surface), the projected image might include an underwater ocean scene. When the device 10 is again rotated such that the front end 14 faces a first wall and the axis x is directed toward the first wall (e.g., the axis x is orthogonal to the plane corresponding to the first wall), the projected image might include an island scene. When the device 10 is rotated such that the front end 14 faces a second wall and the axis x is directed toward the second wall (e.g., the axis x is orthogonal to the plane corresponding to the second wall), the projected image might include a pirate ship scene. As the device 10 is further rotated such that the front end 14 faces other surfaces and the axis x is directed toward those other surfaces, the projected image might include a number of different images and scenes. Then, in embodiments, when the device 10 is rotated such that the front end 14 again faces the ceiling, the projected image again includes the sky scene; when device 10 is rotated such that the front end 14 again faces the floor, the projected image again includes the underwater ocean scene; when the device 10 is rotated such that the front end 14 again faces the first wall, the projected image again includes the island scene; and when the device 10 is rotated such that the front end 14 again faces the second wall, the projected image again includes the pirate ship scene. Thus, in embodiments, a user may selectively project a certain image, based on a movement, orientation, or positioning of the device 10.

The 360-degree projection environment described above, including various display environments, may be automatically created by the device 10, or a specific projected image for a specific external projection surface, or a specific portion of an external projection surface, may be selected by a user. As such, in some embodiments of the invention, a display environment refers to a portion of the 360-degree projection environment that the device 10 is configured to project in response to user manipulation of the device 10. In further embodiments, a user may manipulate the physical orientation of the device 10 to "navigate" to a particular portion of the 360-degree projection environment, thereby projecting only a segment of the virtual environment (i.e., projecting the display environment that is the portion of the virtual, 360-degree projection environment that corresponds to where the user is pointing the device 10). In other words, the content included in a projected image of a portion of the 360-degree "projection environment" may be referred to as a "display environment," as it is a portion of the entire environment that is actually visible (i.e., projected/displayed) for user interaction.

Furthermore, the projected image on each surface may include a drawn projection corresponding to a user input. In embodiments, for example, when the device 10 is positioned such that the front end 14 faces the second wall and a pirate ship scene is displayed, a user may provide an input corresponding to a drawing of a pirate flag. The flag appears as a drawn projection in the projected image. The projected image, including the user-provided pirate flag, is stored in a memory, such as the memory 64 that will be discussed with respect to FIG. 14, associated with the device 10 as being the image that is to be projected when the device 10 is oriented such that the front end 14 faces the second wall. The user may similarly provide inputs in the context of other display environments when the device 10 is oriented in a variety of manners. Because the user inputs may be stored in association with an orientation of the device 10 at the time the user input was provided, when the front end 14 faces the second wall again, the pirate ship scene, including the drawn projection of the pirate flag, may be displayed on the second wall.

Figure 7A:
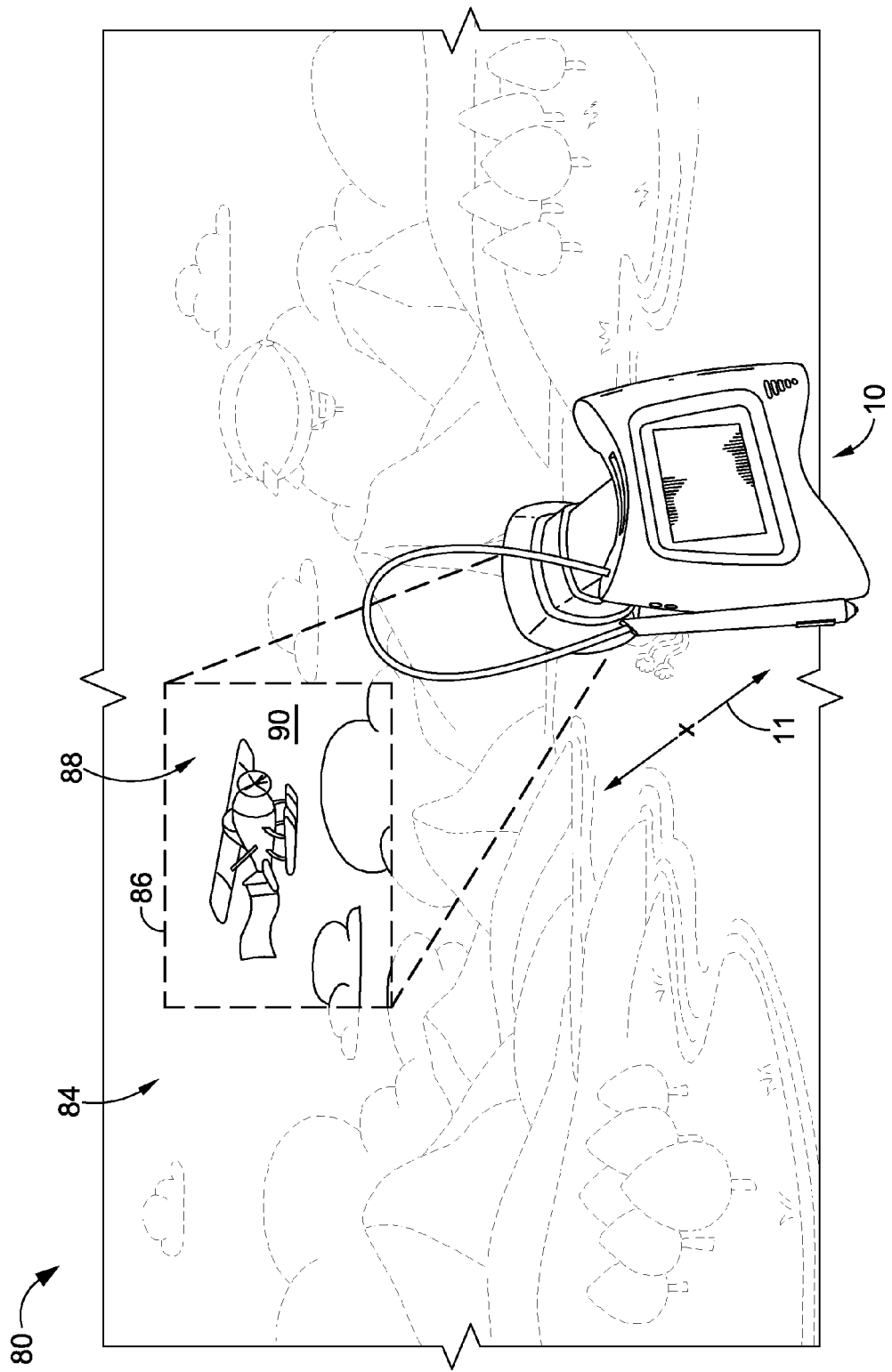
FIG. 7A is a front, perspective view of a first portion of a projection environment, in accordance with an embodiment of the invention.

The 360-degree projection environment referenced above will be further explained with reference to FIGS. 7A-C and 8. In FIG. 7A, for example, an interactive environment 80 including a 360-degree projection environment 84 is illustrated, in accordance with an embodiment of the present invention. The device 10 may be used to project a projected image corresponding to a first portion 88 of the 360-degree projection environment 84 on an external projection surface 90. In this way, the 360-degree projection environment 84 may be compared to a 360-degree canvas, at least a portion of which may be projected by the device 10 on the external projection surface 90, such that the user can view and interact with the projected image corresponding to the first portion 88 of the 360-degree projection environment 84.

As shown in FIG. 7A, the projected image corresponding to the first portion 88 of the 360-degree projection environment 84 is defined by the first portion boundaries 86. As illustrated, the first portion 88 includes a display environment featuring an airplane. The 360-degree projection environment 84, or canvas, may extend beyond the first portion boundaries 86 in all directions, such that a continuous projection environment is provided. Thus, in embodiments, the 360-degree projection environment 84 is larger than the first portion 88. In one embodiment, the projected image corresponding to the first portion 88, which may be defined by the first portion boundaries 86, is 960 by 480 pixels.

Figure 7B:
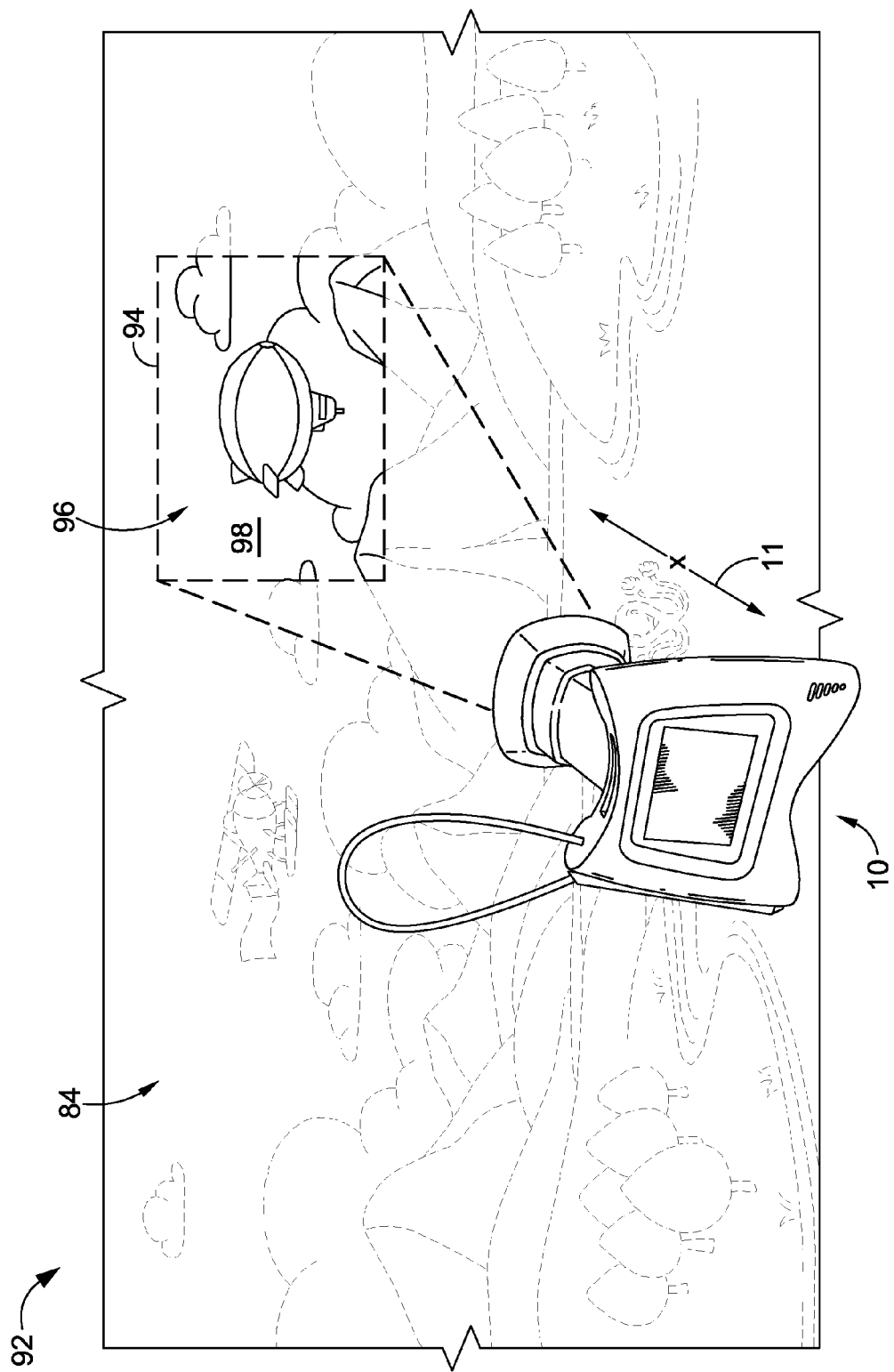
FIG. 7B is a front, perspective view of a second portion of a projection environment, in accordance with an embodiment of the invention.

The exemplary interactive environment 92 of FIG. 7B includes the same 360-degree projection environment 84 that is shown in FIG. 7A, but in FIG. 7B, a projected image corresponding to a second portion 96 of the 360-degree projection environment 84 is provided on an external projection surface 98. The second portion 96 is defined by the second portion boundaries 94 and includes a display environment featuring a blimp.

The first portion 88 and the second portion 96 of FIGS. 7A and 7B, respectively, may correspond to a particular orientation of the device 10. For example, in FIG. 7A, the device 10 is angled up and to the left, such that the axis x, represented by reference numeral 11, of the device 10 is directed toward an upper, left-hand area of the external projection surface 90. Thus, the first portion 88 corresponds to a portion of the 360-degree projection environment 84 that is in an upper, left-hand area of the 360-degree projection environment 84. Similarly, in FIG. 7B, the device 10 is angled up and to the right, such that the axis x is directed toward an upper, right-hand area of the external projection surface 98. Thus, the second portion 96 corresponds to a portion of the 360-degree projection environment 84 that is in an upper, right-hand area of the 360-degree projection environment 84. This feature is further illustrated in the exemplary interactive environment 92 of FIG. 7C, where the device 10 is angled down, such that the axis x is directed to a bottom portion of the external projection surface 104, and thus projects an image corresponding to a third portion 102, defined by third portion boundaries 100, of the 360-degree projection environment 84. The third portion 102 corresponds to a portion of the 360-degree projection environment 84 that is in a bottom area of the 360-degree projection environment 84 and, as illustrated, includes a display environment featuring an octopus in the water. In this way, as a user moves, tilts, rotates, and/or pans the device 10 in any number of directions, a particular portion of the 360-degree projection environment 84 is projected on an external projection surface 104, where the particular portion corresponds to an orientation and/or positioning of the device 10.

Figure 7C:
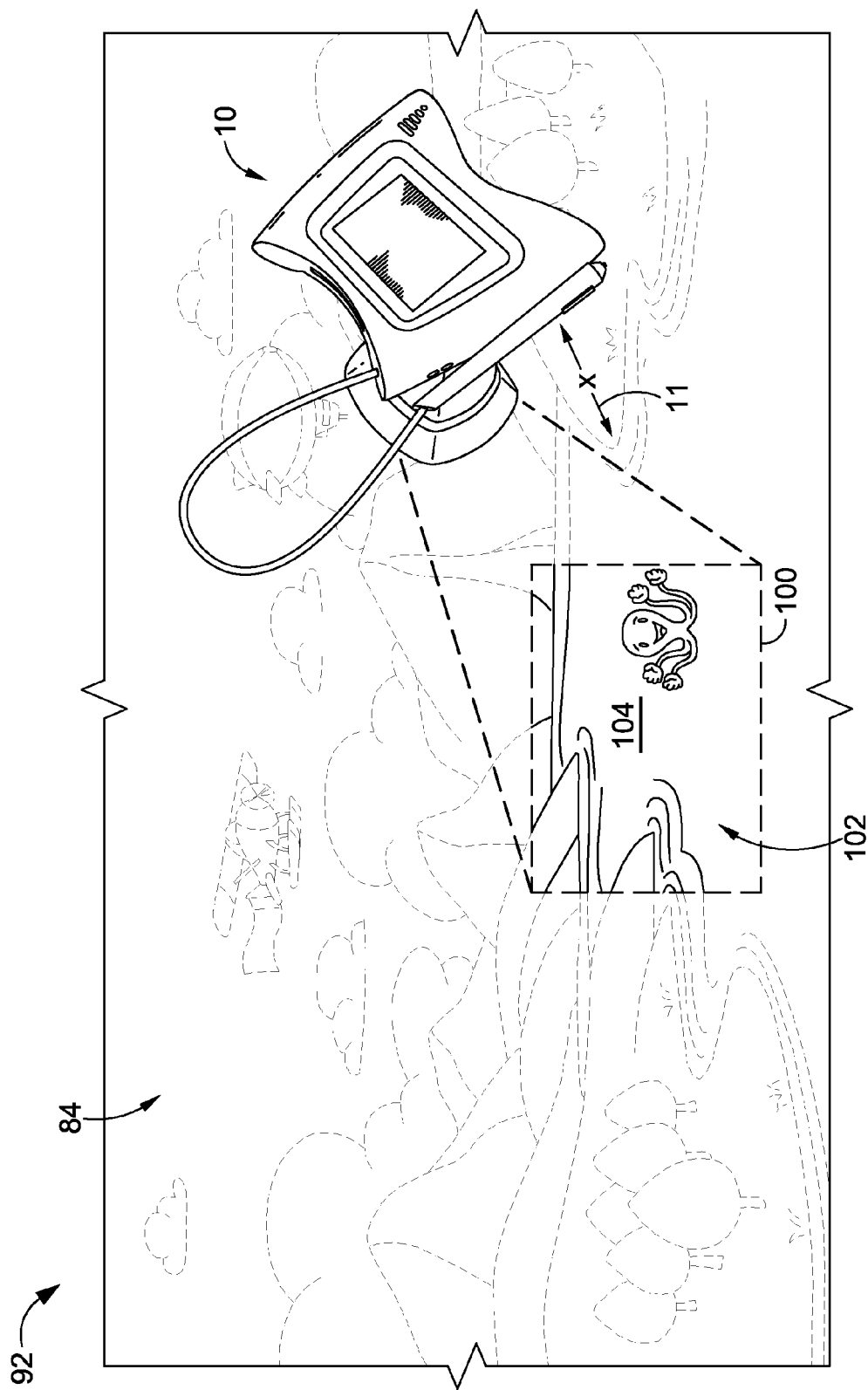
FIG. 7C is a front, perspective view of a third portion of a projection environment, in accordance with an embodiment of the invention.

In embodiments, the first, second, and third portions discussed with respect to FIGS. 7A-7C may be projected on a single external projection surface. In other words, the external projection surfaces 90, 98, and 104 in FIGS. 7A, 7B, and 7C, respectively, may be different areas of the same surface. For example, if the external projection surface is a wall, the projected image corresponding to the first portion 88 may be projected on an upper, left-hand area of the wall; the second portion 96 may be projected on an upper, right-hand area of the wall; and the third portion 102 may be projected on a bottom portion of the wall.

Additionally or alternatively, the external projection surfaces 90, 98, and 104 in FIGS. 7A, 7B, and 7C, respectively, may be different surfaces. For example, the external projection surface 90 of FIG. 7A may be a ceiling, the external projection surface 98 of FIG. 7B may be a first wall, and the external projection surface 104 of FIG. 7C may be a floor. Thus, it will be understood that, while the 360-degree projection environment 84 is illustrated in FIGS. 7A-7C as a flat, two-dimensional environment, that the 360-degree projection environment 84 is not limited to such a configuration. Instead, as will be explained in greater detail with respect to FIGS. 8A-B, the 360-degree projection environment 84 may correspond to a three-dimensional projection environment, such as a spherical projection environment.

Figure 8B:
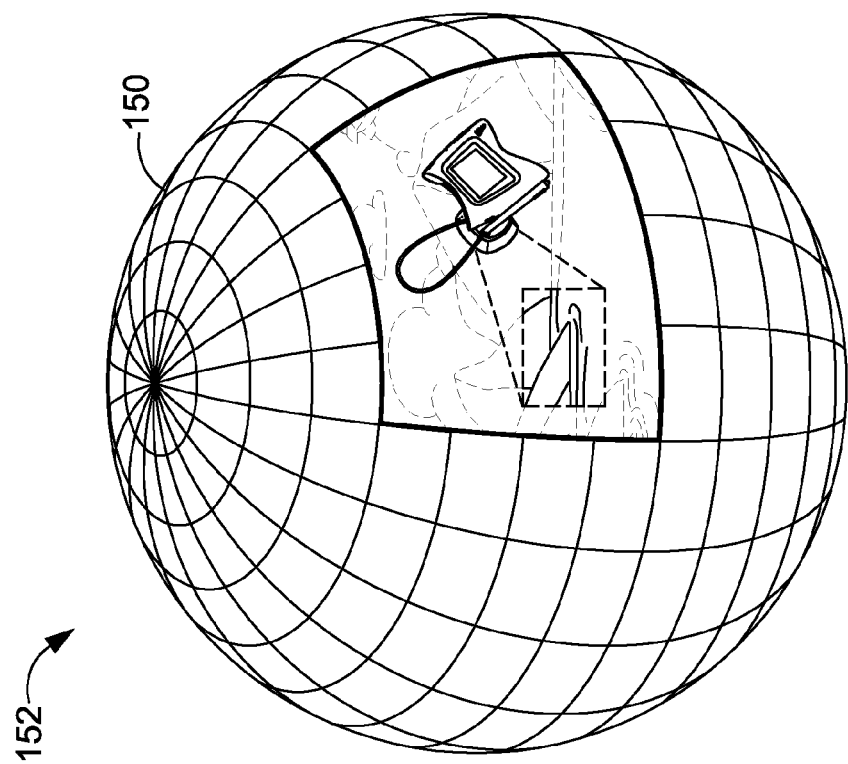
FIG. 8B is a second view of an exemplary spherical projection environment, in accordance with an embodiment of the invention.
Figure 8A:
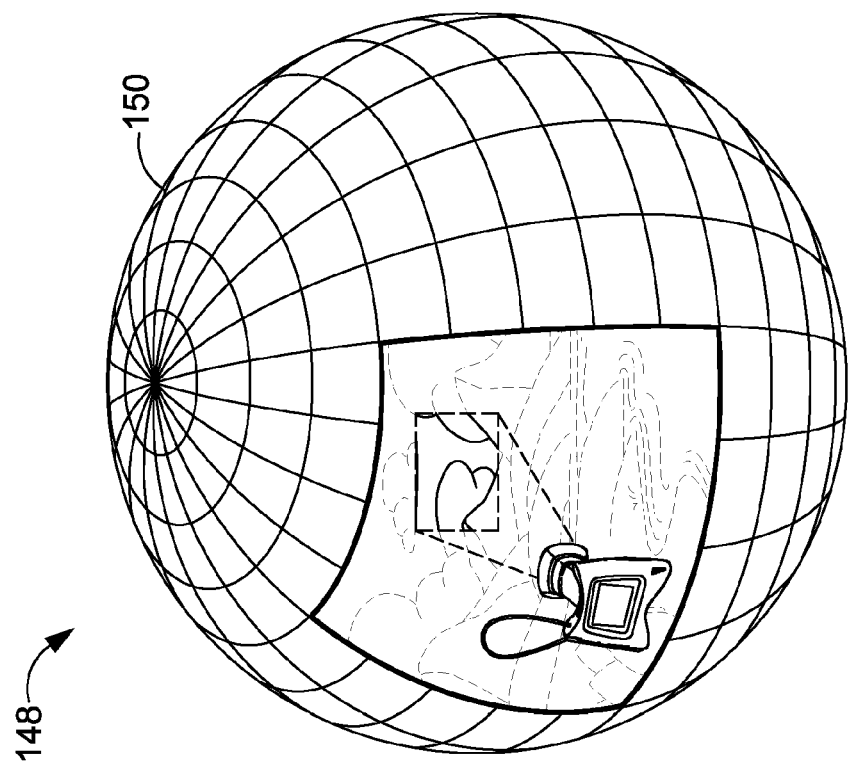
FIG. 8A is a first view of an exemplary spherical projection environment, in accordance with an embodiment of the invention.

As mentioned, the 360-degree projection environment discussed above may resemble any number of three-dimensional objects, such as the exemplary spherical projection environment 150 illustrated in FIGS. 8A-8B. FIG. 8A provides a first view 148 of the exemplary spherical projection environment 150, and FIG. 8B provides a second view 152 of the exemplary spherical projection environment 150. As can be imagined, a continuous projection environment is provided within the spherical projection environment 150 of FIGS. 8A-8B. In other embodiments, the 360-degree projection environment may resemble a cube, a toroid, or any other three-dimensional object. In this way, a continuous, three-dimensional projection environment is provided, such that as a user manipulates the device 10, and a particular portion of the projection environment corresponding to a particular orientation of the device 10 is projected on an external projection surface. The user may thus navigate the projection environment by manipulating the device 10 to project various portions of the projection environment on various external projection surfaces or portions thereof.

A user may navigate the projection environment in any number of ways in order to view and interact with a desired portion of the 360-degree projection environment. A user may navigate the projection environment by physically moving the device 10. For example, the user may move the device 10 up, down, left, or right to view various portions of the projection environment. The user may also hold the device 10 in a stationary position with respect to the user's body (e.g., the user holds the device 10 with outstretched arms), and then move the user's body, such as by running, spinning, jumping, or otherwise moving within a space. For example, the user may hold the device 10 such that its axis x is orthogonal to an axis running vertically through the user's body, such as by holding the device 10 with outstretched arms, and then spin in circles. As the user spins, the portion of the projection environment that is projected on an external projection surface changes in accordance with the orientation of the device 10. For instance, imagine that the user is standing at the center of the spherical projection environment 150 of FIGS. 8A-B while holding the device 10 such that the axis x is orthogonal to an axis running vertically through the user's body. As the user rotates about the vertical axis in a clockwise direction, such as by spinning in place, portions of the spherical projection environment 150 that are positioned along a great circle of the sphere are projected onto an external projection surface.

In further embodiments, a user may navigate the projection environment by panning the device 10 in all directions. This may include panning the device 10 across the floor, ceiling, and walls of a room. A guided tour feature may also be provided, in which the user selects the guided tour option and is automatically guided through the projection environment without any further user intervention.

Additionally or alternatively, the user may navigate the projection environment via physical touch at the touch screen, such as by swiping a finger across the touch screen. Such interaction may manipulate a portion of the projection environment that is projected on an external projection surface. So, for example, in terms of manipulating a portion of the projection environment for projection on an external projection surface, moving the device 10 to the right may have the same effect as a user turning in a clockwise direction while holding the device 10 stationary with respect to the user's body, which may further have the same effect as a user swiping a finger across the screen 32 of the device 10. Other means of manipulating the device 10 in order to interact with the projection environment may also be provided. As such, any number of means may be provided for a user to navigate a continuous projection environment in order to view and interact with a desired portion of that projection environment.

Upon reaching a desired portion of the projection environment, the user may interact with the desired portion in a number of ways. For example, the 360-degree projection environment may be populated with a number of objects and figures with which the user may interact, such as by coloring, animating, and/or otherwise enhancing a desired portion of the 360-degree projection environment. For example, the projection environment may resemble a page from a coloring book, and a user may color a desired portion of the projection environment to be projected on an external projection surface.

A number of features may be provided to enhance the user's experience when interacting with the projection environment. One such feature that may be included is a "freeze frame" or "lock" option. A user may select the freeze frame option in order to freeze a desired portion of the projection environment for interaction. Upon selecting the freeze frame option, the user may move or manipulate the device without changing the portion of the projection environment that is projected on an external projection surface. Thus, a user may freeze a desired portion and then color, animate, or otherwise enhance the desired portion while the desired portion remains fixed. This feature may be beneficial in a variety of scenarios. For example, a user may wish to enhance a portion of the projection environment that corresponds to an orientation of the device that is uncomfortable for the user to maintain, such as an orientation of the device when it is pointed at an external projection surface over the user's head (e.g., a ceiling). In this instance, the user may not wish to hold the device over the user's head while enhancing the desired portion of the projection environment. Instead, the user may wish to freeze the desired portion and hold the device in a more comfortable position while adding enhancements to the desired portion. The user may then "unfreeze" the projection environment and return to navigating around the projection environment by moving and/or manipulating the device. Then, when the user points the device 10 at the ceiling, the user's enhancements may be included in the projected image corresponding to the enhanced portion of the projection environment.

The freeze feature may also be beneficial for young children having unsteady movements. For example, a young child may shake or wobble while holding the device and navigating the projection environment. Thus, the child may wish to freeze a portion of the projection environment with which the child desires to interact, such that the desired portion remains steady during the interaction. In this way, the desired portion remains fixed as the child shakes or wobbles while coloring or otherwise enhancing the desired portion of the projection environment. The freeze frame and/or lock feature discussed above may be turned on or off by selecting a command corresponding to the feature, such as by selecting a button on the device 10. Thus, a user may easily toggle between the various modes.

Another feature that may be included in order to enhance the user's experience while interacting with a projection environment is a smoothing or correction mechanism. Due to the non-linearity of a touch screen, when a user provides an input at the screen 32 of the device, the input may correspond to a determined output that appears pixelated or jagged. A smoothing or correction mechanism may smooth the lines corresponding to the user input such that the determined output to be projected on an external projection surface is smooth. For example, the pixels corresponding to an outer edge of a drawn element may be smoothed. Thus, the visual appearance of a projected image is enhanced, and the user experience is thereby also enhanced.

A calibration feature may also be included in order to enhance the user's experience while interacting with the projection environment. In embodiments, the calibration feature determines the spatial relationship between a location on a screen of the device, such as the screen 32 of the device 10, and a location on a projected image. This feature may ensure that a user input received at the screen is projected at the appropriate location in a projected image on an external projection surface. For example, if the display environment includes an image of a fish, the user may desire to provide a drawing input corresponding to bubbles bubbling from the mouth of the fish located in the upper, right-hand corner of the projected image. The device may be calibrated to ensure that when the user draws bubbles at the upper, right-hand corner of the screen, the determined output corresponding to the user input is a drawn projection located at the fish's mouth in the upper, right-hand corner of the projected image. In other words, the device may be calibrated to ensure that the bubbles are not projected at an incorrect location in the projected image, such as in the upper, left-hand corner of the projected image at the tail of the fish. Calibration dots may be provided on the screen of the device in conjunction with a calibration interface in order to allow the user to calibrate the device. In other embodiments, the device may be pre-calibrated such that user calibration is not required. In some embodiments, calibration may be accomplished by mapping the perimeter of the touch screen to the projected image boundaries.

Various special effects and animation features may be included in the projection environment. Such effects and features may be predefined effects and features. For example, the projection environment may include looping animations in a background of a scene, more robust animations in foreground objects, and other animated enhancements to the projection environment. Thus, as the user explores the projection environment, it may be filled with animation and sound. For example, as an airplane becomes visible in a particular display environment, propellers on the airplane may spin and an airplane engine sound may accompany the animation. In embodiments, the projection coloring environment lacks animation and/or sound as the user explores the projection environment, but upon a user selection, the animation and/or audio features may be triggered. For example, as a user navigates the projection environment, various predefined animations may be activated. In embodiments, such predefined animation may be activated upon a user selection of an active element in the projection environment. For example, a user may encounter a fish in the projection environment. Thus, a user may select the fish in order to activate a swimming animation associated with the fish. Other special effects and animation features may be provided by a user and added to the projection environment.

Figure 9A:
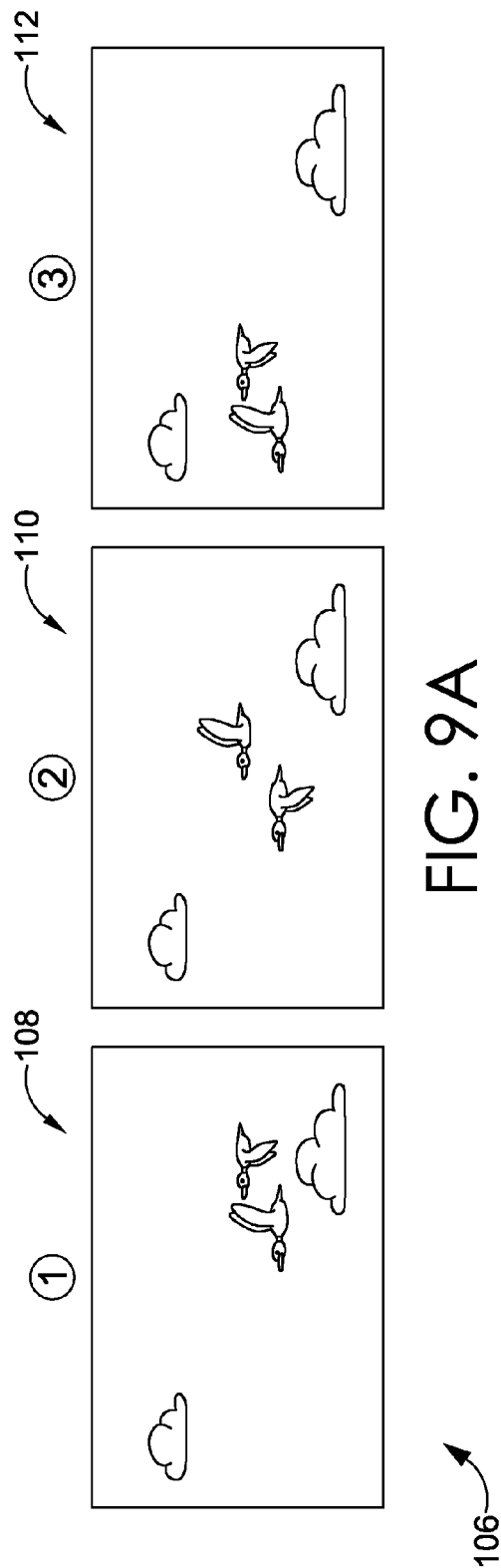
FIG. 9A is an exemplary diagram depicting a first animation method executed by the digital drawing and projection device, in accordance with an embodiment of the invention.
Figure 9B:
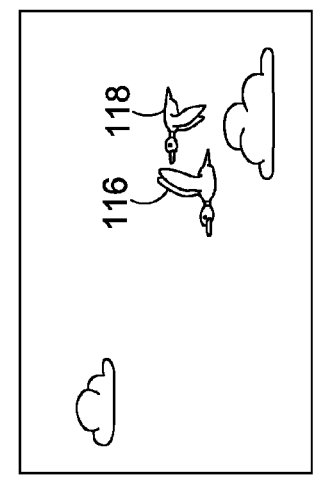
FIG. 9B is an exemplary diagram depicting a second animation method executed by the digital drawing and projection device, in accordance with an embodiment of the invention.

A user may provide customized special effects and animation features in a number of ways. FIGS. 9A-9B illustrate several customized enhancements in accordance with embodiments of the present invention. Beginning with FIG. 9A, a customized animation enhancement 106 is illustrated. The customized animation enhancement 106 may be provided by several user inputs corresponding to a series of discrete images. For example, in FIG. 9A, a user has provided three different drawings of two birds flying across the sky between two clouds. In the first user-provided image 108, the two birds are at the far right-hand side of the frame. One bird has its wings in a raised position, while the other bird has its wings in a lowered position. In the second user-provided image 110, the birds are located in the middle of the frame, and the wing positions associated with the two birds have changed. In the third user-provided image 112, the birds are located at the far left-hand side of the frame, and the wing positions have returned to the position included in the first user-provided image 108. Upon providing these images, a user may then select an animation command, such as by selecting an animation button on the device, in order to activate an animation feature. The animation feature, in embodiments, causes the three user-provided images to be projected in rapid succession to create the effect that the birds are flying across the sky. In this way, a sequential playback of the user-provided images may create an effect similar to that created by a flipbook. The animation feature may further be provided in conjunction with a movement of the device, such that when the user pans the device from side to side, the animation feature is activated and the birds appear to fly across the external projection surface as the device moves.

Additional animation features may be provided, as illustrated in the exemplary animated scene 114 of FIG. 9B. In embodiments, the animated scene 114 is a predefined scene from a projection environment provided by the device, and in further embodiments, the animated scene 114 is a user-provided scene, as described above with respect to FIG. 9A. The animated scene 114 includes a first active element 116 and a second active element 118. A user may select either active element, or both, in order to activate an animation feature associated with the active element. For example, a user may select the first active element 116, and in response, the bird might fly across the display environment of a projected image.

Additionally, special effects and animation features may be activated in response to a movement of the device. For example, if a user provides an input corresponding to a drawing of a fish facing the user's left, a drawn projection corresponding to the user input is projected on an external projection surface. The user may select a freeze frame option, as discussed above, to lock in the image of the fish, such that as the user pans the device, the portion of the projection environment that is projected remains unchanged. In embodiments, as the user slowly pans the device to the left, the fish appears to swim to the left, and if the user quickly moves the device to the right, instead of the fish appearing to swim backwards to the right, the drawn projection of the fish becomes a mirror image of the user input, and the fish appears to change directions and swim in a forward-facing manner to the right.

Further embodiments include additional special effects and animation features to provide an interactive art experience. For example, if a user selects a paint splatter drawing option, an image of a paint splatter may appear on the external projection surface in accordance with a movement of the device. For example, the image of the paint splatter may appear in response to a throwing motion detected at the device. Such a feature would create the appearance that a user is throwing a bucket of paint at the wall.

Figures 10A, 10B:
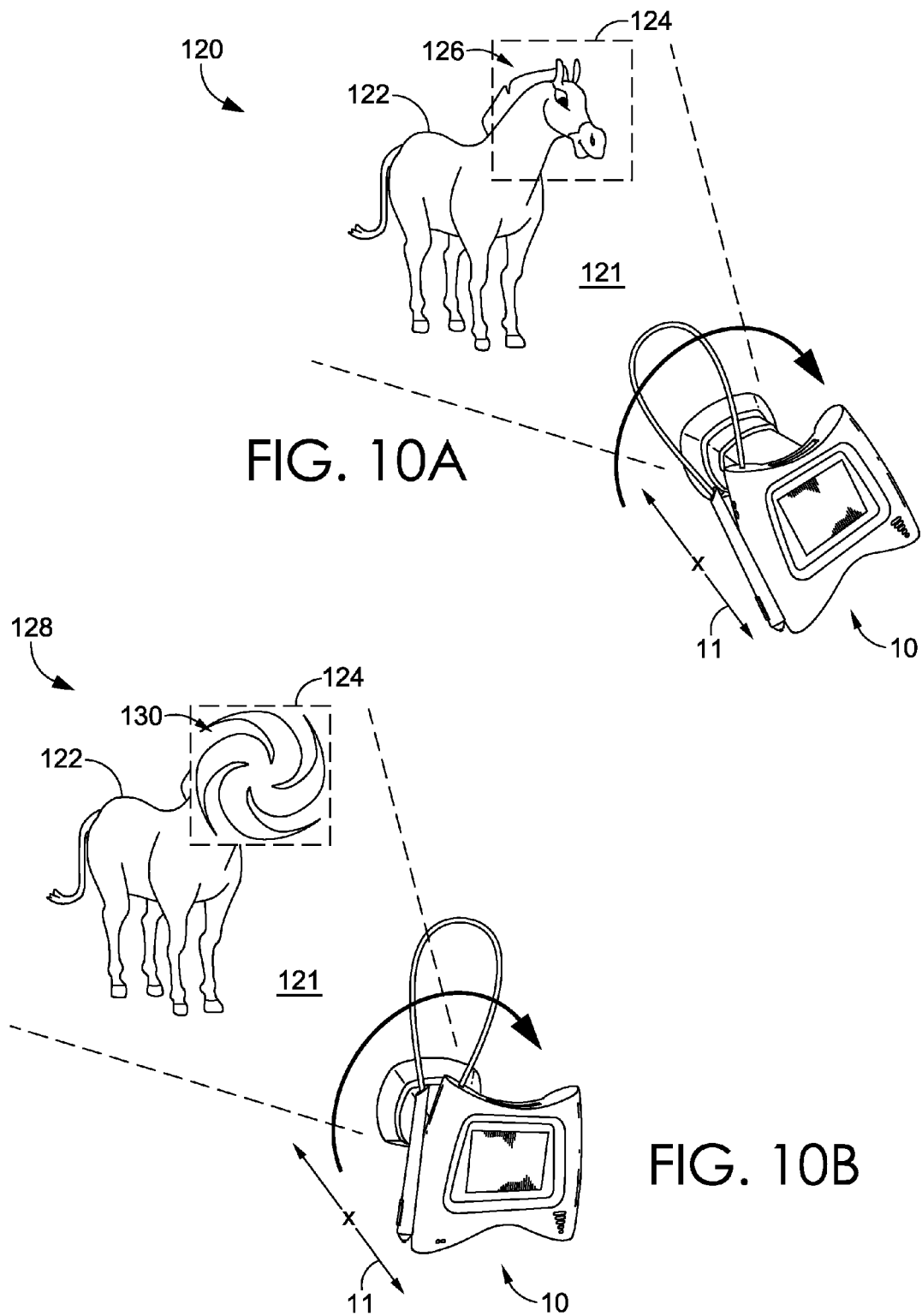
FIG. 10A is a front, perspective view of a selected distortion portion of a display environment, in accordance with an embodiment of the invention.
FIG. 10B is a front, perspective view of an altered distortion portion corresponding to the selected distortion portion of FIG. 10A, in accordance with an embodiment of the invention.

Turning now to FIGS. 10A-10B, additional animation and/or special effects that may be activated in response to a movement of the device 10 are illustrated. In FIG. 10A, the special effects scene 120 includes a projected image of a horse 122 on an external projection surface 121. A selected distortion portion 124 includes an unmodified image 126 of the head of the horse 122. The selected distortion portion 124 may be selected via user input. At least a portion of an image may be selected as the selected distortion portion 124. A special effect may be activated with respect to the selected distortion portion 124 by moving the device 10. For example, a morphing effect may be applied to the selected distortion portion 124 by rotating the device 10 clockwise about the central longitudinal axis x of the device 10. The special effects scene 128 of FIG. 10B illustrates the morphing effect that has been applied to the selected distortion portion 124. As shown in FIG. 10B, the previously unmodified image 126 of the head of the horse 122 has been distorted to produce the altered image 130 of the head of the horse 122, where the head of the horse 122 appears to have been twisted or swirled. The degree of rotation of the device 10 about the axis x may correspond to an extent of the twisting or swirling effect applied to the head of the horse 122. In embodiments, the special effects that may be applied to a selected distortion portion of an image include predefined effects for stretching, swirling, melting, morphing, blending, smearing, swiping, image twisting, color changing, pixelating, and/or smudging. Additionally, in embodiments, such special effects may be provided by other movements of the device 10, such as a movement of the device 10 up, down, left, or right. The predefined effect may correspond to a particular movement of the device 10, such as, for example, applying a predefined smearing effect from left to right across the image when the device 10 is moved from left to right. These special effects may be applied to a selected distortion portion, or if no such portion is selected, the effects may be applied to user-provided enhancements, such as drawn projections (e.g., drawing, coloring), or to the entire display environment of a projected image, including drawn projections and projected elements, such as predefined objects, figures, and backgrounds. Prior to the interaction described above, a freeze frame option may be selected to lock in the image to be distorted, such that as the user moves the device 10, a portion of the projection environment that is projected remains unchanged.

Figure 11A:
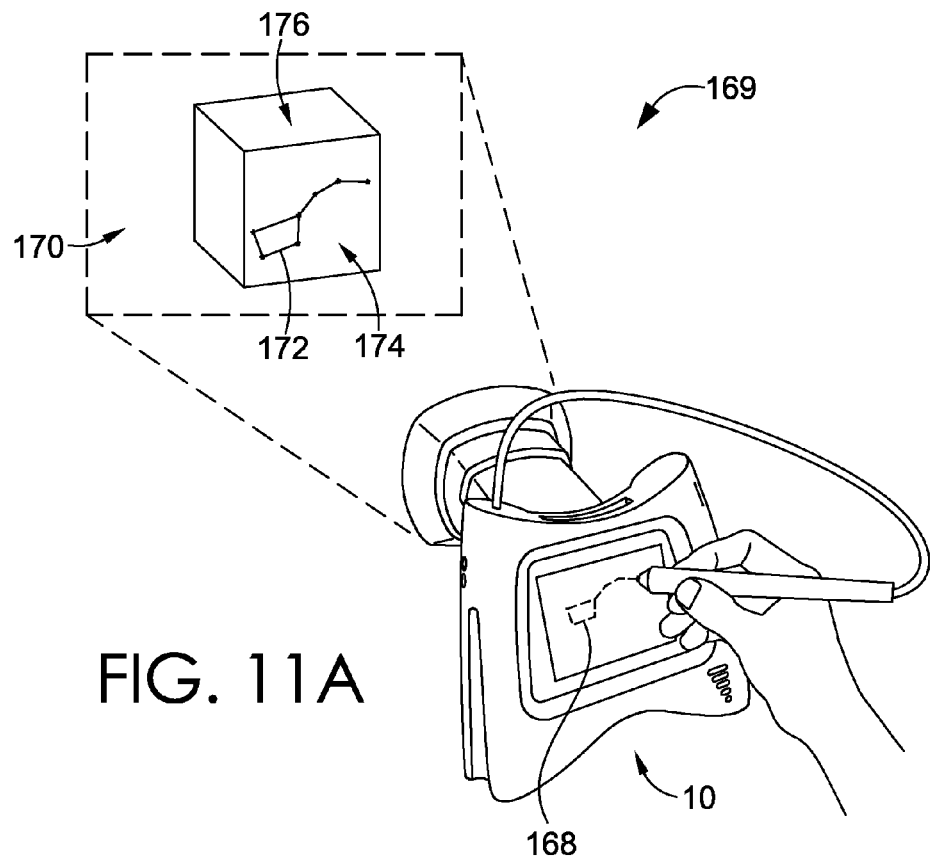
FIG. 11A is a perspective view of an interactive environment, including a handheld digital drawing and projection device projecting a projected image including a first view of a three-dimensional projected element, in accordance with an embodiment of the invention.
Figure 11B:
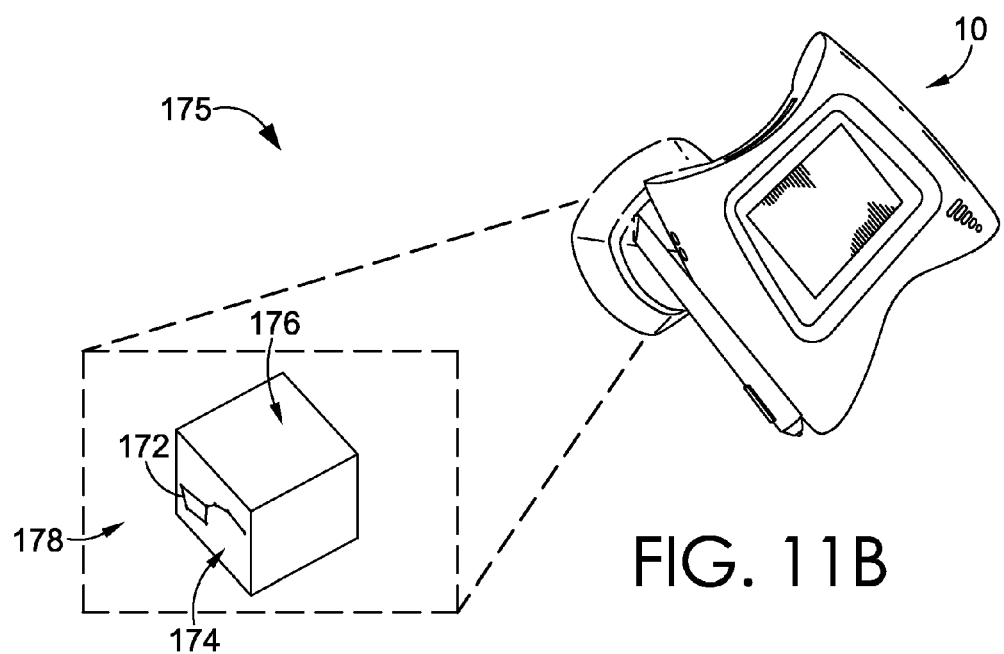
FIG. 11B is a perspective view of an interactive environment, including a handheld digital drawing and projection device projecting a projected image including a second view of a three-dimensional projected element, in accordance with an embodiment of the invention.

Turning now to FIGS. 11A-11B, additional animation and/or special effects that may be activated in response to a movement of the device 10 are illustrated. FIG. 11A provides a view of an exemplary interactive environment 169, in which the device 10 is projecting a projected image 170 of a three-dimensional projected element. The exemplary three-dimensional projected element of FIG. 11A is a cube having six faces, including a first face 174 and a second face 176. As illustrated, a user input 168 may be provided at a touch screen of the device 10, and a corresponding drawn projection 172 may be projected on the first face 174 of the cube. This user input 168 and corresponding drawn projection 172 on the first face 174 of the cube may be stored in a memory, such as the memory 64 of FIG. 14, associated with the device.

As illustrated in the exemplary interactive environment 175 of FIG. 11B, a user may manipulate the orientation of the three-dimensional projected element. As in FIG. 11B, the first face 174, which was at the forefront of the projected image 170 in FIG. 11A, may be featured less prominently in the projected image 178 of FIG. 11B. Instead, in FIG. 11B, the second face 176 may be at the forefront of the projected image 178. In FIG. 11B, the drawn projection 172 may remain associated with the first face 174, and the drawn projection 172 may be adjusted in size and/or configuration to provide an appearance analogous to a real-life cube rotating in front of a user (e.g., the drawn projection 172 in FIG. 11B appears to be farther away from the device 10 and angled away from the device 10, as compared to the drawn projection 172 in FIG. 11B). As can be imagined, a user may further provide a user input associated with other faces of the cube, and as the user manipulates the orientation of the cube, a drawn projection may remain associated with the proper face of the cube. The multiple drawn projections may further be adjusted in size and/or configuration as the orientation of the cube is manipulated to provide an appearance that a cube with pictures drawn on each face is actually rotating in front of the user.

The adjusted orientation of a three-dimensional projected element illustrated in FIGS. 11A-11B may be accomplished in any number of ways. In embodiments, the user may adjust the orientation of the three-dimensional projected element by moving and/or manipulating the device 10. For example, as the user pans the device 10 to the right, the three-dimensional projected element may rotate in a clockwise direction. The user may pan the device 10 in any number of directions to cause the three-dimensional projected element to rotate in a desired direction. Additionally or alternatively, for example, a user may point the device 10 down to view a top surface of the three-dimensional projected element, point the device 10 up to view a bottom surface of the three-dimensional projected element, or point the device 10 to a side to view a desired side surface of the three-dimensional projected element. The user may further adjust the orientation of the three-dimensional projected element via physical touch at the touch screen, such as by swiping a finger across the touch screen. Other means of adjusting the orientation of the three-dimensional projected element are also included within the scope of this invention. In embodiments, prior to the interaction described above, a freeze frame option is selected to lock in the three-dimensional projected element, such that the three-dimensional projected element is the portion of the projection environment that remains projected.

In this way, a user may provide a drawing input at each surface of a three-dimensional projected element, and the user may then move and/or manipulate the device 10 in any number of ways to cause the projected three-dimensional element to move and/or rotate. At the same time, a drawn projection associated with the appropriate portion of the three-dimensional projected element may be projected and adjusted, as needed. It will be understood that, although FIGS. 11A-11B illustrate a cube, any number of three-dimensional projected elements are included within the scope of the present invention. Additionally, while the discussion above refers to providing a user input associated with a face of a three-dimensional projected element, such user input may be associated with any portion of the three-dimensional projected element. For example, if the three-dimensional projected element is a sphere, a drawn user input might be associated with a particular portion of the sphere. The user might then manipulate the device 10 to cause the sphere to spin, and as the sphere spins, the drawn projection corresponding to the drawn user input may be projected at the appropriate portion of the sphere.

As explained above, special effects and/or animation effects may be activated within the projection environment. Such effects may be predefined and/or may be customized by a user. The effects may be provided while the device is operating in a navigation mode, as well while the device is operating in a freeze frame mode. Certain elements of a display environment, such as projected elements and drawn projections, may be enhanced with special effects and/or animation effects. Additionally or alternatively, the entire display environment, including a background of the display environment, may be enhanced with special effects and/or animation effects. The enhanced elements may be predefined elements and/or may be user-provided elements, such as drawn projections. The enhancements may be activated by a user selection of an enhancement option, such as by selecting a button on the device. The enhancements may further be activated based on a position, orientation, and/or movement of the device. In some instances, a combination of a selectable option, such as a button, and movement of the device may be used to activate animation. For example, a user may select a projected element, such as an object or a figure, in the display environment for animation. Upon such selection, a function checkbox may appear, allowing the user to select one or more enhancement options to be applied to the projected element. If the user selects an animation enabling option from the function checkbox, then animation may be enabled such that when the device is later moved and/or manipulated, the projected element is animated.

Additionally, zooming effects may also be activated in response to a movement of the device. Such effects may be understood by reference to an embodiment of the projection device that has a fixed focus. In such embodiments, if a user stands 10 feet away from an external projection surface while using the device to project an image on the external projection surface, and the user then begins walking toward the external projection surface, the content of the projected image does not change, but the scale of the projected image may decrease. For example, if the projected image includes a sun, trees, and flowers, as a user walks toward the external projection surface, the projected image still includes the sun, trees, and flowers, but the size of these projected elements may shrink. Similarly, if the user backs away from the external projection surface, the content of the projected image may remain the same, but the size of the projected elements may increase.

Other embodiments of the device, however, may provide zooming effects. If a zoom feature corresponding to such zooming effects is activated, then in the example above, as the user walks toward the external projection surface, the device provides the effect of zooming in on a portion of the projected image. For example, as the user walks toward the external projection surface, the content of the projected image may change such that an enlarged version of the tree is provided, while the sun and the flowers are no longer visible. Then, when the user backs away from the external projection surface, the effect of zooming out may be provided, such that the content included in the projected image gradually increases until the tree, sun, and flowers are all visible in the projected image. The size of the projected image (i.e., the boundaries of the projected image) may or may not change when the zoom feature is activated.

The zoom feature may be provided in a number of ways. In one embodiment, the device includes a range location component that provides a logical zoom. The component may rely on an ultrasonic or infrared detector. These detectors may send a signal that bounces back from an external projection surface. Based on this signal, the detectors may determine the distance between the device and the external projection surface. Thus, the detectors may detect changes in distance and automatically provide the corresponding zoom in or zoom out effects discussed above.

Additionally or alternatively, the zoom feature may be provided by an accelerometer, a magnetometer, or a combination of the two. In such an embodiment, the zoom feature may be based on a relative change in distance applied to the device 10. For example, a user may stand at a first point and provide an indication to the device 10 that the first point corresponds to a start point. The user may then move to a second point and provide an indication to the device that the second point corresponds to a stop point. The accelerometer and/or magnetometer may recognize these two different points and thus be calibrated to recognize that a movement from the first point to the second point corresponds to a movement from a start point to a stop point. In embodiments, the user may input the start point at a location from which the user desires to interact with the projection environment, and may further input the stop point at a location corresponding to a desired external projection surface. Following this calibration, when the user moves from the start point to the stop point, a zoom feature may be activated, where the zoom effect is based on the relative change in position between the start and stop points. For example, if the user walks one-half of the distance between the start point and the stop point, the device may provide a zoom effect corresponding to a fifty-percent enlargement of a portion of the projected image.

In further embodiments, the zoom effect may be provided in conjunction with a camera included in the device and a glyph. A glyph may be attached to a desired projection surface. In one embodiment, the camera included in the device may be configured to recognize the glyph and use the glyph to determine a spatial relationship between the camera and the external projection surface to which the glyph is attached. Thus, for example, a user may tape a glyph to a wall corresponding to a desired external projection surface, the camera may use the glyph to determine a spatial relationship between the device and the wall, and the projection environment may then be mapped to the location of the user. Thus, as the user moves with respect to the external projection surface, the appropriate zoom in or zoom out effect may be provided. In embodiments, the glyph is provided to a user with a purchase of the device. In other embodiments, the glyph may be retrieved from a remote location, such as a website. For example, a user may visit www.Crayola.com in order to print a copy of the glyph. In further embodiments, multiple glyphs coupled to multiple potential projection surfaces may be identified by a camera coupled to the device, and used to calibrate the projection of a projection environment onto one of multiple surfaces.

Figure 12:
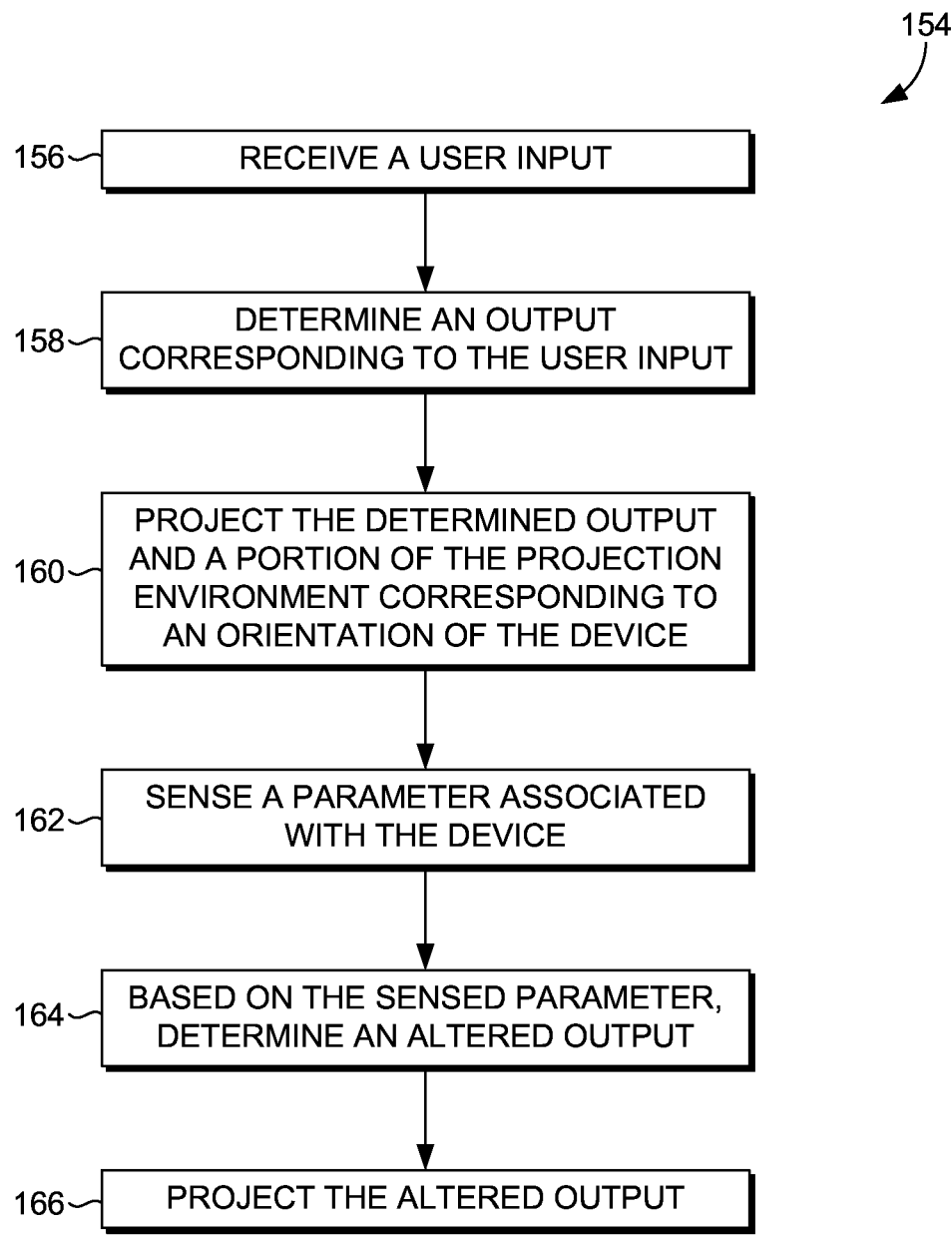
FIG. 12 is an exemplary flow diagram including steps for providing a projected image on an external projection surface, in accordance with an embodiment of the invention.

As has been described above, the device may project a projected image on an external projection surface based on received user input, as well as on a position, orientation, or movement of the device. In some embodiments, the projected image may be altered based on additional user input and/or a change in position, orientation, or motion of the device. FIG. 12 provides an exemplary flow diagram 154, which includes steps for projecting such images on external projection surfaces.

At step 156, a first user input is received. An output corresponding to the user input is determined at step 158. The determined output and a portion of the projection environment corresponding to an orientation of the device are projected at step 160. Then, at step 162, a parameter associated with the device is sensed. Such sensed parameter may include a position, orientation, acceleration, and/or magnetic field associated with the device. Based on the sensed parameter, at step 164, an altered output is determined. For example, the altered output may be a mirror image of the determined output. This altered output is projected at step 166.

Figure 13:
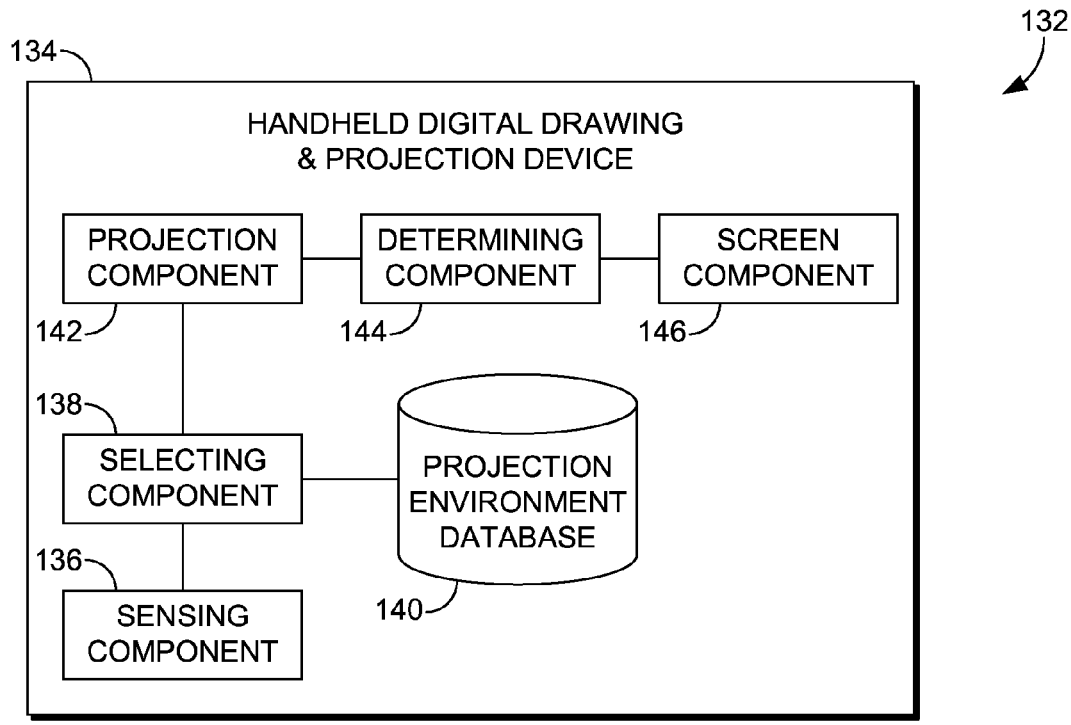
FIG. 13 is a block diagram of an exemplary system that may be included in a handheld digital drawing and projection device, in accordance with an embodiment of the invention.

Turning now to FIG. 13, an exemplary system 132 that may be included in a handheld digital drawing and projection device 134, such as the device 10 of FIG. 1, is provided. The system 132 may include a number of components, such as a sensing component 136, a selecting component 138, a projection component 142, a determining component 144, and a screen component 146. The system 132 is but one example of a system for use with the present invention. The system 132 is not intended to suggest any limitation as to the scope of use or functionality of embodiments of the invention, and should not be interpreted as having any dependency or requirement relating to any one component nor any combination of components illustrated.

The screen component 146 may include a touch screen for receiving user input. A stylus may be used to provide such input to the screen component 146. The determining component 144 may determine an output corresponding to the received user input. The sensing component 136 may be configured to sense a parameter associated with the device 134, including at least one of an acceleration, orientation, position, and magnetic field associated with the device 134.

The selecting component 138 may be configured to select an image for projection by a projector included in the projection component 142. The selecting component 138 may base its selection of an image on a parameter sensed by the sensing component 136, as well as on the output determined by the determining component 144. In some embodiments, the selecting component 138 retrieves a display environment that is stored in the projection environment database 140 to include in the image selected for projection. The projection environment database 140 may also store user enhancements provided to various portions of the projection environment, such that when a particular enhanced portion is selected for projection, the projection includes the user-provided enhancements.

Figure 14:
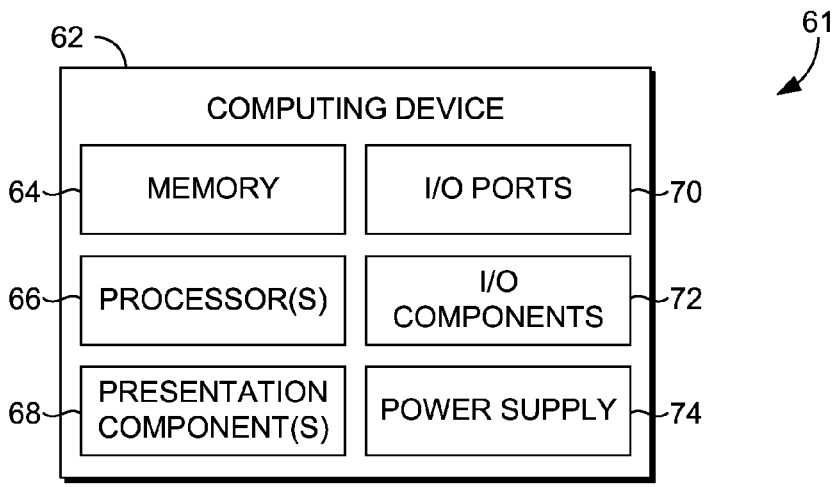
FIG. 14 is an exemplary computing device for use with a handheld digital drawing and projection device, in accordance with an embodiment of the invention.

Referring finally to FIG. 14, an exemplary operating environment 61 in which embodiments of the present invention may be implemented is described below to provide a general context for various aspects of the present invention. Exemplary operating environment 61 includes a computing device 62, which is but one example of a computing environment for use with the present invention. The computing device 62 is not intended to suggest any limitation as to the scope of use or functionality of embodiments of the invention, and should not be interpreted as having any dependency or requirement relating to any one component nor any combination of components illustrated. In embodiments, the computing device 62 is included in the device 10 of FIG. 1 to provide various features discussed with respect to FIGS. 1-12.

Embodiments of the invention may be described in the general context of computer code or machine-useable instructions, including computer-useable or computer-executable instructions such as program modules, being executed by the computing device 62. The computing device 62 typically includes a variety of computer-readable media, which may be any available media that is accessible by the computing device 62, such as computer storage media that stores computer-executable instructions for executing by the computing device 62.

As shown in the example of FIG. 14, the computing device 62 may include the following components: a memory 64, one or more processors 66, one or more presentation components 68, one or more input/output (I/O) ports 70, one or more I/O components 72, and an illustrative power supply 74. The power supply 74 might include a rechargeable battery. As will be understood, the components of exemplary computing device 62 may be used in connection with one or more embodiments of the invention. In embodiments, computing device 62 may include fewer components than those depicted in FIG. 14, or other components in addition to those depicted in FIG. 14.

Embodiments of the memory 64 include computer storage media in the form of volatile and/or nonvolatile memory that may be removable, non-removable, or a combination thereof. The computing device 62 may also include one or more processors 66 that read data from various entities such as the memory 64 or the I/O components 72. The presentation component(s) 68 may be configured to present data indications to a user or other device, such as a display device, speaker, printing component, vibrating component, and the like. In further embodiments, the I/O ports 70 allow the computing device 62 to be logically coupled to other devices, while the I/O components 72 may include a camera, touch screen, microphone, joystick, game pad, satellite dish, scanner, printer, wireless device, and a controller, such as a stylus (such as the stylus 30 of FIG. 1), a keyboard and a mouse, a natural user interface (NUI), and the like.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A handheld digital drawing and projection device comprising:
   a screen for receiving a user input;
   a determining component for determining an output corresponding to the received user input; and
   a projector for projecting the determined output onto an external projection surface, wherein the projector further projects a display environment comprising one or more display environment elements that provide context for a user-drawn projection received via the screen and projected simultaneously with the display environment based on the determined output.

2. The device of claim 1, further comprising a stylus for providing the user input at the screen, wherein the stylus is tethered to the device, and further wherein the determining component senses an amount of pressure applied to the screen via the stylus, the amount of pressure corresponding to at least one function associated with the device.

3. The device of claim 1, further comprising a sensing component for sensing at least one of an acceleration of the device, an orientation of the device, and a magnetic field around the device, wherein the determined output projected onto an external surface corresponds to one or more of a sensed acceleration of the device, a sensed orientation of the device, and a sensed magnetic field around the device.

4. The device of claim 3, further comprising a selecting component included in the handheld device for selecting an image to be projected by the projector, the selected image based on the at least one of the sensed acceleration of the device, orientation of the device, and magnetic field around the device, and the output determined by the determining component.

5. The device of claim 4, wherein a particular image is selected based on a particular orientation of the device, the particular orientation of the device corresponding to a particular portion of an external projection surface, such that when the sensing component senses the particular orientation of the device, the selecting component selects the particular image to be projected and the projector projects the particular image onto the particular portion of the external projection surface, said particular image comprising at least a portion of a 360-degree projection environment.

6. The device of claim 4, wherein the selected image includes the determined output corresponding to the received user input and at least a portion of the display environment comprising one or more projected elements.

7. The device of claim 3, wherein the determined output is altered to provide an altered output based on the at least one of the sensed acceleration of the device, orientation of the device, and magnetic field around the device.

8. The device of claim 7, wherein the altered output is a mirror reflection of the determined output based on the sensed acceleration of the device.

9. A method for projecting an interactive display onto an external projection surface, the method comprising:
   receiving a user input on a screen of a handheld digital drawing and projection device, the handheld digital drawing and projection device comprising:
      a screen for receiving a user input,
      a determining component for determining an output corresponding to the received user input,
      a projector for projecting the determined output onto the external projection surface; and
      a speaker;
   at the determining component, determining the output corresponding to the received user input for projection onto the external projection surface;
   at the projector, projecting the determined output onto the external projection surface; and
   at the speaker, providing at least one of an audio output selected by the user and an automatically provided audio output corresponding to the determined output for projecting.

10. The method of claim 9, wherein the handheld digital drawing and projection device further comprises a selecting component for selecting an image to be projected on a particular portion of the external projection surface, the selected image based on at least one of an acceleration of the device, orientation of the device, and magnetic field around the device.

11. The method of claim 9, wherein the selected image comprises the determined output and a display environment.

12. The method of claim 9, wherein the projector further projects a display environment, the display environment comprising one or more projected elements.

13. A handheld digital drawing and projection device comprising:
   a rear end comprising a rear handle portion and a screen for receiving a user input;
   a front end opposite said rear end, said front end comprising a lens through which an output corresponding to the received user input is projected;
   an intermediate portion positioned between the rear end and the front end and comprising an intermediate handle portion;
   a cartridge slot configured to receive a cartridge;
   a stylus for providing the user input at the screen;
   a tether for tethering the stylus to a body of the handheld digital drawing and projection device;
   a stylus holding compartment configured to hold the stylus;
   a data port for recharging a rechargeable battery of the device wherein the data port is configured to send and receive data at the device;
   a speaker; and
   at least one sensor for detecting a movement, acceleration, and orientation of the device.

14. The device of claim 13, wherein the intermediate portion comprises an intermediate portion width that is smaller in size than a front end width of the front end and a rear end width of the rear end.

15. The device of claim 13, wherein the screen is a touch screen that receives the user input based on contact between the touch screen and the stylus to provide a change in capacitance with respect to the screen.

16. The device of claim 13, wherein the at least one sensor includes an accelerometer and a magnetometer.

17. The device of claim 16, wherein the accelerometer and the magnetometer enable the device to selectively project a particular image on a particular portion of an external projection surface.

* * * * *